(12) United States Patent
Chen et al.

(10) Patent No.: US 11,109,381 B2
(45) Date of Patent: Aug. 31, 2021

(54) METHOD AND DEVICE FOR WIRELESS COMMUNICATION IN UE AND BASE STATION

(71) Applicants: JinHui Chen, Shanghai (CN); XiaoBo Zhang, Shanghai (CN)

(72) Inventors: JinHui Chen, Shanghai (CN); XiaoBo Zhang, Shanghai (CN)

(73) Assignee: SHANGHAI LANGBO COMMUNICATION TECHNOLOGY COMPANY LIMTTED, Shanghai (CN)

( * ) Notice: Subject to any disclaimer, the term of this patent is extended or adjusted under 35 U.S.C. 154(b) by 220 days.

(21) Appl. No.: 16/377,273

(22) Filed: Apr. 8, 2019

(65) Prior Publication Data

US 2019/0313392 A1    Oct. 10, 2019

(30) Foreign Application Priority Data

Apr. 8, 2018   (CN) .......................... 201810305673.6

(51) Int. Cl.
*H04W 72/04* (2009.01)
*H04L 5/00* (2006.01)

(52) U.S. Cl.
CPC ......... *H04W 72/046* (2013.01); *H04L 5/0007* (2013.01); *H04L 5/0051* (2013.01); *H04W 72/0466* (2013.01)

(58) Field of Classification Search
CPC ... H04L 5/0007; H04L 5/0005; H04L 5/0035; H04L 5/0048; H04L 5/00051; H04W 72/044; H04W 72/0466; H04W 72/046

(Continued)

(56) References Cited

U.S. PATENT DOCUMENTS

2012/0236911 A1    9/2012  Sadowsky et al.
2020/0288479 A1*   9/2020  Xi .............................. H04B 7/02
(Continued)

FOREIGN PATENT DOCUMENTS

CN    101379748 A    3/2009
CN    102349346 A    2/2012
(Continued)

OTHER PUBLICATIONS

CN201810305673.6 1st Office Action dated Apr. 28, 2021.
CN201810305673.6 First Search Report dated Apr. 22, 2021.

*Primary Examiner* — Rownak Islam

(57) ABSTRACT

A method and device for wireless communication in a UE and a base station is disclosed. The user equipment receives a first bit block, transmits or receives a first wireless signal on a first time-frequency resource set, and transmits a second wireless signal on a second time-frequency resource set. The user equipment determines to transmit the second wireless signal on the second time-frequency resource set. A second bit field in the first bit block is used to indicate the first time-frequency resource set. A first bit field in the first bit block is used to simultaneously indicate a first spatial parameter group for transmitting the first wireless signal and a second spatial parameter group for transmitting the second wireless signal or a first multiple access signature for generating the second wireless signal. The spatial parameter group information used for scheduling PDSCH or PUSCH is applied to the uplink grant-free transmission.

20 Claims, 14 Drawing Sheets

(58) Field of Classification Search
USPC .......................................................... 370/329
See application file for complete search history.

(56) References Cited

U.S. PATENT DOCUMENTS

2020/0305232 A1* 9/2020 Miao ........................ H04B 1/38
2020/0389885 A1* 12/2020 Tomeba ............ H04W 72/0413

FOREIGN PATENT DOCUMENTS

| CN | 107248902 A | 10/2017 |
| CN | 107425947 A | 12/2017 |
| CN | 107864479 A | 3/2018 |
| CN | 107872299 A | 4/2018 |

\* cited by examiner

METHOD AND DEVICE FOR WIRELESS COMMUNICATION IN UE AND BASE STATION

CROSS REFERENCE TO RELATED APPLICATION

This application claims the priority benefit of Chinese Patent Application Serial Number CN201810305673.6, filed on Apr. 8, 2018, the full disclosure of which is incorporated herein by reference.

BACKGROUND

Technical Field

The present disclosure relates to a transmission method and device in a wireless communication system, and more particularly to a method and device for a grant free uplink transmission.

Related Art

In the traditional long-term evolution (LTE) system of the 3rd Generation Partner Project (3GPP), the uplink transmission on the terminal side is often based on grant of the base station. However in the Phase1 of 5G New Radio (NR) Access Technology, the terminal can perform the grant-free uplink transmission in the air interface resources pre-configured by the base station for reducing the overhead of air interface signaling and improving the spectral efficiency of the system.

Massive MIMO (Multi-Input Multi-Output) is another key technology for wireless communication in the future. By increasing the numbers of antennas, the transmission rate or system capacity is enhanced. Considering the enhancement of multi-antenna technology, the grant-free transmission scheme and the utilization efficiency of the grant-free resources needs to be further enhanced.

SUMMARY

For the grant-free communication, the UE (user Equipment) or the other terminal equipment itself determines the air interface resources occupied by the uplink transmission. The inventor discovered through research that how to use grant-free resources more efficiently, and for massive MIMO, how to use uplink transmit beam and multiple access signature on radio resources that pre-configured to be grant-free communication is an urgent problem to be solved.

In view of the above problems, the present disclosure provides a solution. In case of no conflict, the embodiments and the features in these embodiments in the user equipment of the present disclosure can be applied to a base station and vice versa. In case of no conflict, the embodiments and the features in these embodiments of the present disclosure may be combined with each other arbitrarily.

The present disclosure discloses a method for wireless communication in a user equipment (UE), comprising:

receiving a first control signal, wherein a first bit block is used to generate the first control signal, the first bit block comprises a first bit field and a second bit field, the first bit field in the first bit block is used to indicate a first spatial parameter group, and the second bit field in the first bit block is used to indicate a first time-frequency resource set;

receiving a first wireless signal on the first time-frequency resource set, wherein the first spatial parameter group is used to receive the first wireless signal, or transmitting a first wireless signal on the first time-frequency resource set, wherein the first spatial parameter group is used to transmit the first wireless signal;

transmitting a second wireless signal on a second time-frequency resource set, wherein the second time-frequency resource set is orthogonal to the first time-frequency resource set, and a second spatial parameter group is used to transmit the second wireless signal, a first multiple access signature is used to generate the second wireless signal;

wherein the user equipment itself determines that the second wireless signal is transmitted on the second time-frequency resource set; the second spatial parameter group is associated with the first bit field in the first bit block, or the first multiple access signature is associated with the first bit field in the first bit block.

In one embodiment, the first control signal is transmitted on the Physical Downlink Control Channel (PDCCH).

In one embodiment, the first bit block is a Downlink Control Information (DCI) bit block.

In one embodiment, the first bit block is a DCI configured for Physical Downlink Shared Channel (PDSCH) scheduling.

In one embodiment, the first bit block conforms to DCI format 1_1 in 3GPP TS 38.212.

In one embodiment, the first wireless signal is transmitted on the Physical Downlink Shared Channel (PDSCH).

In one embodiment, the first bit field is used to transmit Transmission Configuration Indication (TCI).

In one embodiment, the second bit field is used to transmit frequency domain resource assignment.

In one embodiment, the first spatial parameter set is used to generate analog beam(s) that receives the first wireless signal.

In one embodiment, the first bit block is a DCI configured for Physical Uplink Shared Channel (PUSCH) scheduling.

In one embodiment, the first bit block conforms to DCI format 0_1 in 3GPP TS 38.212.

In one embodiment, the second bit field is used to transmit frequency domain resource assignment.

In one embodiment, the first wireless signal is transmitted on the Physical Uplink Shared Channel (PUSCH).

In one embodiment, the first bit field is used to transmit Sounding reference signal resource indicator (SRI).

In one embodiment, the second bit field is used to transmit frequency domain resource assignment.

In one embodiment, the first spatial parameter group is used to generate analog beam(s) that transmits the first wireless signal.

In one embodiment, time domain resources in the first time-frequency resource set is associated with time domain resources occupied by the first control signal.

In one embodiment, the foregoing method may apply the spatial parameter group information used for scheduling the PDSCH to the grant-free uplink transmission, thereby reducing interference among the user equipments performing grant-free uplink transmission.

In one embodiment, the foregoing method may apply spatial parameter group information used for scheduling the PUSCH to the grant-free uplink transmission, thereby reducing interference among user equipments performing grant-free uplink transmission.

Specifically, according to an aspect of the present disclosure, time domain resources occupied by the second time-frequency resource set is associated with time domain resources occupied by the first control signal.

In one embodiment, the advantage of the foregoing mentioned method is to determine the timeliness of the spatial parameter group information used for the PDSCH or PUSCH applied to the grant-free uplink transmission by defining a time domain connection.

Specifically, according to an aspect of the present disclosure, further comprising receiving a first reference signal set before receiving the first control signal, wherein spatial parameter group used to receive the first reference signal set is used to speculate to obtain the first spatial parameter group, or transmitting a first reference signal set before receiving the first control signal, wherein a spatial parameter group used to transmit the first reference signal set is used to speculate to obtain the first spatial parameter group; wherein the first bit field in the first bit block indicates the first reference signal set.

In one embodiment, the foregoing method may determine the first spatial parameter group, increase system flexibility, and reduce signaling overhead.

Specifically, according to an aspect of the present disclosure, the first bit field in the first bit block is used to indicate a first multiple access signature group from M multiple access signature groups, where M is a positive integer greater than 1, the first multiple access signature group comprises the first multiple address signature.

In one embodiment, there is not a multiple access signature that simultaneously belongs to any two of the M multiple access signature groups.

In one embodiment, multiple access signatures within the same multiple access signature group of the M multiple access signature groups are orthogonal in pairwise.

In one embodiment, two multiple access signatures respectively belonging to two multiple access signature groups in the M multiple access signature groups are not orthogonal.

In one embodiment, the advantages of the foregoing mentioned method are that reducing signaling overhead and increasing flexibility of the user equipment terminal for multiple access signature selection.

Specifically, according to an aspect of the present disclosure, the user equipment determines the first multiple access signature by itself from the first multiple access signature group.

In one embodiment, the advantages of the foregoing mentioned method are that reducing signaling overhead and increasing flexibility of the user equipment terminal for multiple access signature selection.

Specifically, according to an aspect of the present disclosure, a first scrambling sequence is used to generate the second wireless signal, the first scrambling sequence is one of M scrambling sequences, and the M scrambling sequences are respectively used for the M multiple access signature groups, the M multiple access signature groups are in one-to-one correspondence with the M scrambling sequences, and the first scrambling sequence is the only scrambling sequence adopted by the first multiple access signature group.

In one embodiment, the foregoing mentioned method has the advantage of reducing the signaling overhead for notifying the scrambling sequence.

The present disclosure discloses a method for wireless communication in a base station device, comprises:

transmitting a first control signal, wherein a first bit block is used to generate the first control signal, the first bit block comprises a first bit field and a second bit field, the first bit field in the first bit block is used to indicate a first spatial parameter group, and the second bit field in the first bit block is used to indicate a first time-frequency resource set;

transmitting a first wireless signal on the first time-frequency resource set, wherein the first spatial parameter group is used to receive the first wireless signal, or receiving a first wireless signal on the first time-frequency resource set, the first spatial parameter group is used to transmit the first wireless signal;

receiving a second wireless signal on a second time-frequency resource set, wherein the second time-frequency resource set is orthogonal to the first time-frequency resource set, and a second spatial parameter group is used to transmit the second wireless signal, a first multiple access signature is used to generate the second wireless signal;

wherein, transmitter of the second wireless signal itself determines that the second wireless signal is transmitted on the second time-frequency resource set; the second spatial parameter group is associate with the first bit field in the first bit block, or the first multiple access signature is associated with the first bit field in the first bit block;

Specifically, according to an aspect of the present disclosure, time domain resources occupied by the second time-frequency resource set is associated with time domain resources occupied by the first control signal.

Specifically, according to an aspect of the present invention, further comprising transmitting a first reference signal set before transmitting the first control signal, a spatial parameter group used to receive the first reference signal set is used to speculate to obtain the first spatial parameter group, or receiving a first reference signal set before transmitting the first control signal, spatial parameter group used to transmit the first reference signal set is used to speculate to obtain the first spatial parameter group;

Wherein, the first bit field in the first bit block indicates the first reference signal set.

Specifically, according to an aspect of the present disclosure, the first bit field in the first bit block is used to indicate a first multiple access signature group from M multiple access signature groups, M being a positive integer greater than one, the first multiple access signature group further comprising the first multiple access signature.

Specifically, according to an aspect of the present disclosure, the user equipment itself determines the first multiple access signature from the first multiple access signature group.

Specifically, according to an aspect of the present disclosure, a first scrambling sequence is used to generate the second wireless signal, the first scrambling sequence is one of M scrambling sequences, and the M scrambling sequences are respectively used for the M multiple access signature groups, and the M multiple access signature groups are in one-to-one correspondence with the M scrambling sequences, and the first scrambling sequence is the only scrambling sequence adopted by the first multiple access signature group.

The present disclosure discloses a user equipment (UE) for wireless communication, which comprises:

a first receiver, receiving a first control signal, wherein a first bit block is used to generate the first control signal, the first bit block comprising a first bit field and a second bit field, the first bit field in the first bit block is used to indicate a first spatial parameter group, and the second bit field in the first bit block is used to indicate a first time-frequency resource set;

a first transceiver, receiving a first wireless signal on the first time-frequency resource set, the first spatial parameter group is used to receive the first wireless signal, or transmitting a first wireless signal on the first time-frequency resource set, the first spatial parameter group being used to transmit the first wireless signal;

a second transmitter, transmitting a second wireless signal on a second time-frequency resource set, the second time-frequency resource set is orthogonal to the first time-frequency resource set, and the second spatial parameter group is used to transmit the second wireless signal, the second wireless signal is generated by a first multiple access signature;

wherein the user equipment itself determines to transmit the second wireless signal on the second time-frequency resource set; the second spatial parameter group is associated with the first bit field in the first bit block, or the first multiple access signature is associated with the first bit field in the first bit block.

In one embodiment, the user equipment is characterized in that time domain resources occupied by the second time-frequency resource set is associated with time domain resources occupied by the first control signal In one embodiment, the user equipment is characterized in that the first transceiver receives a first reference signal set before receiving the first control signal, spatial parameter group used to receive the first reference signal set is used to speculate to obtain the first spatial parameter group, or transmitting a first reference signal group, spatial parameter group used to transmit the first reference signal set is used to speculate to obtain the first spatial parameter group; wherein, the first bit field in the first bit block indicates the first reference signal set.

In one embodiment, the foregoing user equipment is characterized in that the first bit field in the first bit block is used to indicate a first multiple access signature group from M multiple access signature groups, M being a positive integer greater than one, the first multiple access signature group further comprising the first multiple access signature.

In one embodiment, the user equipment is characterized in that the second transmitter itself determines the first multiple access signature from the first multiple access signature group.

In one embodiment, the user equipment is characterized in that a first scrambling sequence is used to generate the second wireless signal, the first scrambling sequence is one of M scrambling sequences, and the M scrambling sequences are respectively used for the M multiple access signature groups, the M multiple access signature groups are in one-to-one correspondence with the M scrambling sequences, and the first scrambling sequence is the only scrambling sequence adopted by the first multiple access signature group.

The present disclosure discloses a base station device for wireless communication, which comprises:

a first transmitter, transmitting a first control signal, a first bit block is used to generate the first control signal, the first bit block comprises a first bit field and a second bit field, where the first bit field in the first bit block is used to indicate a first spatial parameter group, and the second bit field in the first bit block is used to indicate a first time-frequency resource set;

a second transceiver, transmitting a first wireless signal on the first time-frequency resource set, the first spatial parameter group is used to receive the first wireless signal, or receiving a first wireless signal on the first time-frequency resource set, the first spatial parameter group being used to transmit the first wireless signal;

a second receiver, receiving a second wireless signal on a second time-frequency resource set, the second time-frequency resource set is orthogonal to the first time-frequency resource set, a second spatial parameter group being used to transmit the second wireless signal, the second wireless signal is generated by a first multiple access signature;

wherein transmitter of the second wireless signal itself determines to transmit the second wireless signal on the second time-frequency resource set; the second spatial parameter group is associated with the first bit field in the first bit block, or the first multiple access signature is associated with the first bit field in the first bit block.

In one embodiment, the foregoing base station device is characterized in that time domain resources occupied by the second time-frequency resource set is associated with time domain resources occupied by the first control signal.

In one embodiment, the foregoing base station device is characterized in that the second transceiver transmits a first reference signal set before transmitting the first control signal, and spatial parameter group used to receive the first reference signal set is used to speculate to obtain the first spatial parameter group, or receiving a first reference signal set, spatial parameter group used to transmit the first reference signal set is used to speculate to obtain the first spatial parameter group; wherein, the first bit field in the first bit block indicates the first reference signal set.

In one embodiment, the foregoing base station device is characterized in that the first bit field in the first bit block is used to indicate a first multiple access signature group from M multiple access signature groups, M being a positive integer greater than one, the first multiple access signature group further comprising the first multiple access signature.

In one embodiment, the foregoing base station device is characterized in that transmitter of the second wireless signal itself determines the first multiple access signature from the first multiple access signature group.

In one embodiment, the foregoing base station device is characterized in that a first scrambling sequence is used to generate the second wireless signal, the first scrambling sequence is one of M scrambling sequences, and the M scrambling sequences are respectively used for the M multiple access signature groups, and the M multiple access signature groups and the M scrambling sequences are in one-to-one correspondence, the first scrambling sequence is only scrambling sequence adopted by the first multiple access signature group.

In one embodiment, the present disclosure has the following advantages compared with the traditional solution:

The spatial parameter group information used for scheduling the PDSCH or the PUSCH is applied to the uplink grant-free transmission, thereby reducing the interference among the user equipments performing grant-free uplink transmission, and improving the performance of grant-free uplink transmission.

BRIEF DESCRIPTION OF THE DRAWINGS

Other features, objects, and advantages of the present disclosure will become more apparent from the detailed description of the accompanying drawings.

DETAILED DESCRIPTION OF THE EMBODIMENTS

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
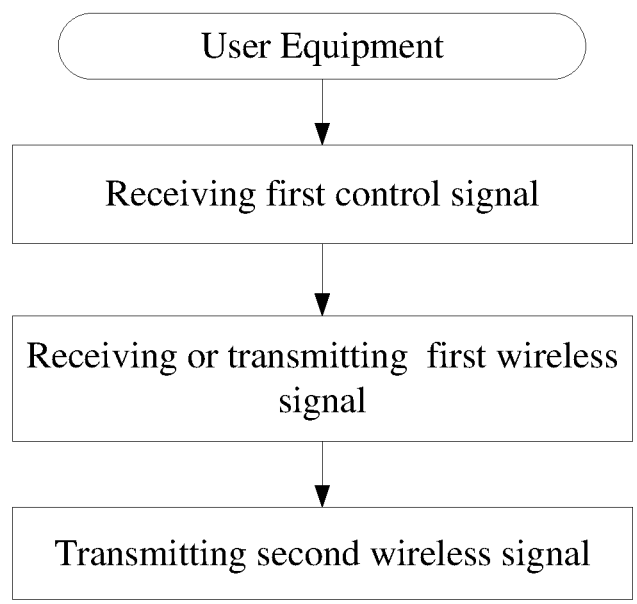
FIG. 1 shows a flowchart of transmitting a second wireless signal according to one embodiment of the present disclosure.

Embodiment I shows a flowchart of a transmitting a second wireless signal, as shown in FIG. 1.

In Embodiment I, the user equipment sequentially receives a first control signal, receives or transmits a first wireless signal, and transmits a second wireless signal.

In Embodiment I, a first bit block is used to generate the first control signal, the first bit block comprising a first bit field and a second bit field, the first bit field in the first bit block is used to indicate a first spatial parameter group, and the second bit field in the first bit block is used to indicate a first time-frequency resource set; receiving the first wireless signal on the first time-frequency resource set, where the first spatial parameter group is used to receive the first wireless signal, or transmitting the first wireless signal on the first time-frequency resource set, the first spatial parameter group is used to transmit the first wireless signal; transmitting the second wireless signal on a second time-frequency resource set, where the second time-frequency resource set is orthogonal to the first time-frequency resource set, and a second spatial parameter group is used to transmit the second wireless signal, a first multiple access signature is used to generate the second wireless signal; wherein the user equipment itself determines that the second wireless signal is transmitted on the second time-frequency resource set; the second spatial parameter group is associated with the first bit field in the first bit block, Alternatively, the first multiple access signature is associated with the first bit field in the first bit block In one embodiment, a PDCCH is used to transmit the first control signal; the first bit block is a DCI bit block.

In one embodiment, the first bit block is used to schedule a PDSCH configured to transmit the first wireless signal, the first bit field is a TCI field, and the second bit field is used to indicate the frequency domain resources allocated to PDSCH.

In one embodiment, the first bit block is used to schedule a PUSCH configured to transmit the first wireless signal, the first bit field is a SRI field, and the second bit field is used to indicate the frequency domain resources allocated to PUSCH.

In one embodiment, the second time-frequency resource set is composed of a positive integer number of RBs (Resource Blocks).

In one embodiment, the minimum unit of the time-frequency resource is an RE (Resource Element).

In one embodiment, one RB comprises 12 REs.

In one embodiment, the first bit block is sequentially subjected to passing through the CRC attached, the channel coding, the rate matching, the scrambling, the modulation mapper, the layer mapper, the precoding, the resource element mapper, the OFM symbol generation to generate the second control signal.

In one embodiment, the second control signal is sequentially subjected to passing through the OFDM symbol demodulation, RE demapping, layer demapping, demodulation, channel decoding, and CRC check to obtain the first bit block.

In one embodiment, a PDSCH is used to transmit the first wireless signal, and the first spatial parameter group is configured by a phase shifter acting on the radio frequency link to generate analog beam(s) that receives the first wireless signal.

In one embodiment, the PUSCH is used to transmit the first wireless signal, and the first spatial parameter group is configured by a phase shifter acting on the radio frequency link to generate analog beam(s) that transmits the first wireless signal.

In one embodiment, a grant-free PUSCH is used to transmit the second wireless signal.

In one embodiment, the receiver of the second wireless signal determines whether the second wireless signal is transmitted by the user equipment via blind detection.

In one embodiment, the blind detection comprises energy detection.

In one embodiment, the blind detection comprises performing a correlation operation on a received signal and a reference signal sequence corresponding to the user equipment.

In one embodiment, the blind detection comprises performing a Cyclic Redundancy Check (CRC) on the received signal by using an identifier corresponding to the user equipment.

In one embodiment, the second spatial parameter group is configured by a phase shifter acting on the radio frequency link to generate analog beam(s) that is used to transmit the second wireless signal.

In one embodiment, the first wireless signal and the second wireless signal are spatially QCL (Quasi-colated).

In one embodiment, the spatially QCL of two wireless signals means the spatial parameter group that used to receive a wireless signal can be used to infer and obtain a spatial parameter group for receiving another wireless signal.

In one embodiment, the spatially QCL of two wireless signals means the spatial parameter group that used to transmit a wireless signal can be used to infer and obtain a spatial parameter group for receiving another wireless signal.

In one embodiment, the spatially QCL of two wireless signals means the spatial parameter group that used to receive a wireless signal can be used to infer and obtain a spatial parameter group for transmitting another wireless signal.

In one embodiment, the spatially QCL of two wireless signals means that the spatial coverage of the two wireless signals is similar.

In one embodiment, the two wireless signals are both uplink wireless signals.

In one embodiment, the two wireless signals are both downlink wireless signals.

In one embodiment, one of the two wireless signals is an uplink wireless signal and the other is a downlink wireless signal.

In one embodiment, the first spatial parameter group is the same as the second spatial parameter group.

In one embodiment, the first spatial parameter group is different from the second spatial parameter group, and the first spatial parameter group is associated with the second spatial parameter group.

In one embodiment, the first spatial parameter group is associated with the first multiple access signature.

In one embodiment, the first multiple access signature comprises an extended sequence.

In one embodiment, the first multiple access signature comprises an interleaving sequence.

In one embodiment, the first multiple access signature comprises a symbol level scrambling sequence.

In one embodiment, the first spatial parameter group is associated with an extended sequence included by the first multiple access signature.

In one embodiment, the first spatial parameter group is associated with a symbol level scrambling sequence included by the first multiple access signature.

In an embodiment, the first bit field in the first bit block indicates a first index value, and the first index value is used to determine the first multiple access signature from a pre-configured first configuration table.

In an embodiment, the first bit field in the first bit block indicates a first index value, and the first index value is used to determine a multiple access signature group in which the first multiple access signature is located from a pre-configured first configuration table.

In one embodiment, the time domain resources occupied by the second time-frequency resource set is associated with the time domain resources occupied by the first control signal.

In one embodiment, the second time-frequency resource set belongs to a pre-configured first time-frequency resource pool.

In one embodiment, RRC (Radio Resource Control) signaling is used to configure the first time-frequency resource pool.

In one embodiment, the PDSCH is used to transmit signaling for configuring the first time-frequency resource pool.

In one embodiment, the second time-frequency resource set belongs to a first time window, and the first time window is associated with the time domain resources occupied by the first control signal.

In one embodiment, the user equipment receives the first reference signal set before receiving the first control signal, and a spatial parameter group used to receive the first reference signal set is used to speculate to obtain the first spatial parameter group, the first bit field in the first bit block indicating the first reference signal set.

In one embodiment, the user equipment transmits a first reference signal set before receiving the first control signal, and a spatial parameter group used to transmit the first reference signal set is used to speculate to obtain the first spatial parameter group, the first bit field in the first bit block indicating the first reference signal set.

In one embodiment, the first bit field in the first bit block is used to indicate a first multiple access signature group from M multiple access signature groups, M being a positive integer greater than one, the first multiple access signature group comprises the first multiple access signature.

In one embodiment, the user equipment itself determines the first multiple access signature from the first multiple access signature group.

In one embodiment, a first scrambling sequence is used to generate the second wireless signal, the first scrambling sequence is one of M scrambling sequences, and the M scrambling sequences are respectively used for the M multiple access signature groups, the M multiple access signature groups are in one-to-one correspondence with the M scrambling sequences, and the first scrambling sequence is only scrambling sequence adopted by the first multiple access signature group.

Embodiment II

Figure 2:
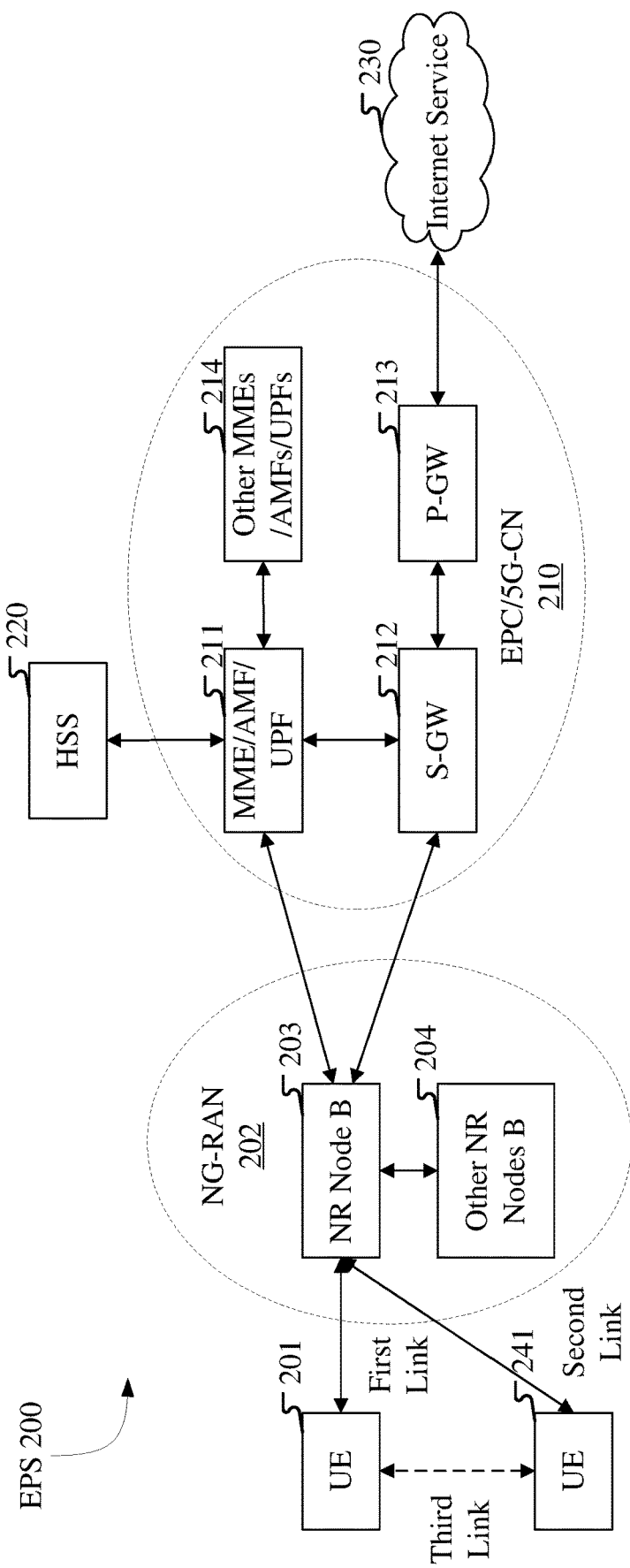
FIG. 2 shows a schematic diagram of network architecture according to one embodiment of the present disclosure.

Embodiment II shows a schematic diagram of network architecture, as shown in FIG. 2.

Embodiment II illustrates a schematic diagram of a network architecture according to the present discloses, as shown in FIG. 2.

FIG. 2 describes a system network structure 200 of NR 5G, LTE(long-term evolution) and LTE-A (long-term evolution advanced). The network architecture 200 of NR 5G or LTE may be referred to as an EPS (evolve packet system) 200 or some other suitable terminology. The EPS 200 may include one or more UEs 201, NG-RAN (radio access network) 202, 5G-CN(core network)/EPC(evolved packet core) 210, HSS(Home Subscriber Server) 220 and the internet service 230. EPS may be interconnected with other access networks, but for the sake of simplicity, these entities/interfaces are not shown. As shown in FIG. 2, the EPS provides the packet switching services. Those skilled in the art would readily appreciate that the various concepts presented throughout this disclosure can be extended to networks or other cellular networks that provide circuit switched services. The NG-RAN comprises an NR Node B (gNB) 203 and other gNBs 204. The gNB 203 provides user and control plane protocol termination for the UE 201. The gNB 203 can be connected to other gNBs 204 via an Xn interface (eg, a backhaul). The gNB 203 may also be referred to as a base station, a base transceiver station, a wireless base station, a wireless transceiver, a transceiver function, a basic service set (BSS), an extended service set (ESS), a TRP (transmission and reception point), or some other suitable terminology. The gNB 203 provides the UE 201 with an access point to the 5G-CN/EPC 210. In the embodiment, the UE201 comprises cellular telephones, smart phones, Session Initiation Protocol (SIP) phones, laptop computers, personal digital assistants (PDAs), satellite wirelesses, non-terrestrial base station communications, satellite mobile communications, global positioning systems, multimedia devices, Video devices, digital audio player (e.g. MP3 players), cameras, game consoles, drones, aircrafts, narrowband physical network devices, machine type communication devices, land vehicles, cars, wearable devices, or any other similar to functional devices. A person skilled in the art may also refer to UE 201 as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, remote terminal, handset, user agent, mobile client, client or some other suitable term. The gNB 203 is connected to the 5G-CN/EPC 210 through an S1/NG interface. 5G-CN/EPC 210 comprises MME/AMF/UPF 211, other MME (Mobility Management Entity)/AMF (Authentication Management Field)/UPF (User Plane Function) 214 An S-GW (Service Gateway) 212 and a P-GW (Packet Date Network Gateway) 213. The MME/AMF/UPF 211 is a control node that handles signaling between the UE 201 and the 5G-CN/EPC 210. In general, MME/AMF/UPF 211 provides bearer and connection management. All User IP (Internet Protocol) packets are transmitted through the S-GW 212, and the S-GW 212 itself is connected to the P-GW 213. The P-GW 213 provides UE IP address allocation as well as other functions. The P-GW 213 is connected to the internet service 230. The internet service 230 comprises an operator-compatible internet protocol service, and may specifically include the Internet, an intranet, an IMS (IP Multimedia Subsystem), and a PS Streaming Service (PSS).

In one embodiment, the UE 201 corresponds to the user equipment in this disclosure.

In one embodiment, the UE 201 corresponds to the terminal in this disclosure.

In one embodiment, the gNB203 corresponds to the base station in this disclosure.

In one embodiment, the UE201 supports the data transmission in the unlicensed spectrum in a wireless communication.

In one embodiment, the gNB203 supports the data transmission in the unlicensed spectrum in a wireless communication.

In one embodiment, the Non-Orthogonal Multiple Access (NOMA) wireless communication is supported by the UE201.

In one embodiment, the NOMA wireless communication is supported by the gNB203.

In a one embodiment, the grant-free uplink transmission is supported by the UE 201.

In one embodiment, the grant-free uplink transmission is supported by the gNB203.

In one embodiment, the competition uplink transmission is supported by the UE 201.

In one embodiment, the competition uplink transmission is supported by the gNB203.

In one embodiment, the beamforming uplink transmission is supported by the UE 201.

In a one embodiment, the beamforming uplink transmission is supported by the gNB203.

In one embodiment, the Massive-MIMO uplink transmission is supported by the UE201.

In one embodiment, the Massive-MIMO uplink transmission is supported by the gNB203.

Embodiment III

Figure 3:
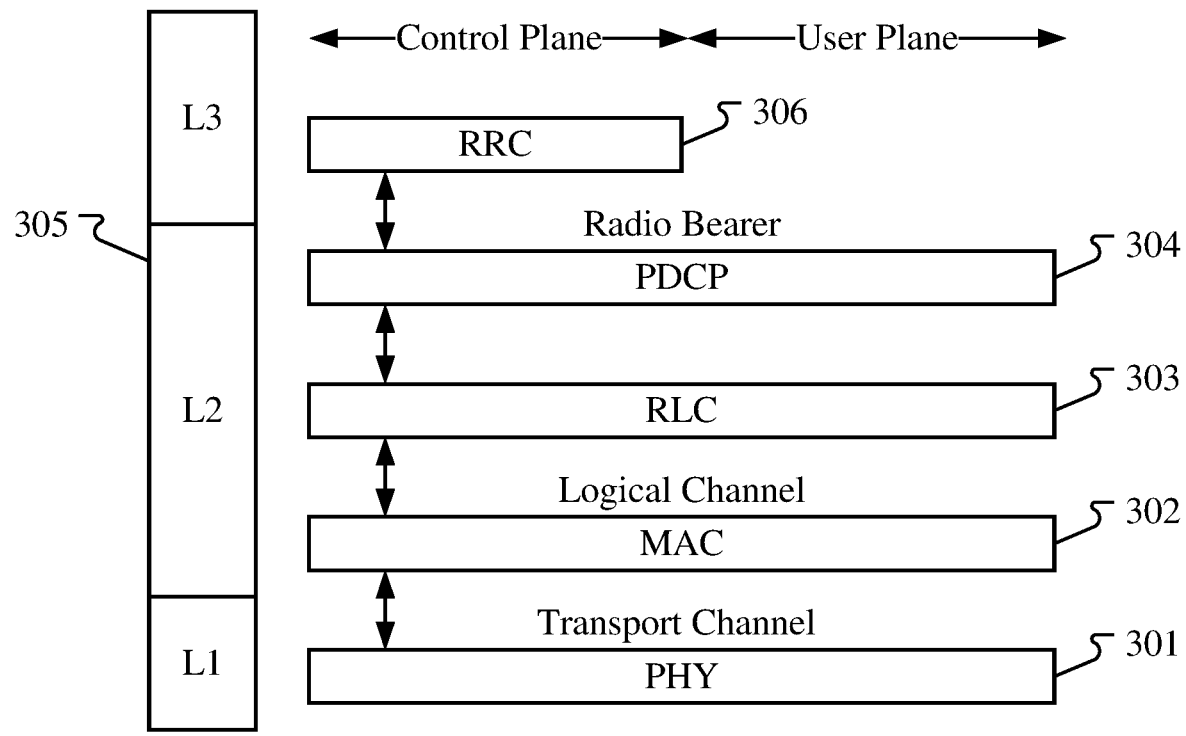
FIG. 3 shows a schematic diagram of a wireless protocol architecture of a user plane and a control plane according to one embodiment of the present disclosure.

Embodiment III shows a schematic diagram of wireless protocol architecture of a user plane and a control plane according to the present disclosure, as shown in FIG. 3.

FIG. 3 is a schematic diagram illustrating an embodiment of a wireless protocol architecture for a user plane and a control plane, and FIG. 3 shows a wireless protocol architecture for the user equipment (UE) and the base station equipment (gNB or eNB) in three layers: layer 1, layer 2 and layer 3. Layer 1 (L1 layer) is the lowest layer and implements various physical layer (PHY) signal processing functions, and layers above layer 1 belong to higher layers. The L1 layer will be referred to herein as PHY 301. Layer 2 (L2 layer) 305 is above PHY 301 and is responsible for the link between the UE and the gNB through PHY 301. In the user plane, L2 layer 305 comprises a media access control (MAC) sub-layer 302, a radio link control (RLC) sub-layer 303 and a packet data convergence protocol (PDCP) sub-layer 304, and these sub-layers terminate at the gNB on the network side. Although not illustrated, the UE may have several upper layers above the L2 layer 305, further comprising a network layer (e.g. an IP layer) terminated at the P-GW on the network side and terminated at the other end of the connection (e.g. Application layer at the remote UE, server, etc.). The PDCP sub-layer 304 provides multiplexing between different wireless bearers and logical channels. The PDCP sublayer 304 also provides header compression for upper layer data packets to reduce wireless transmission overhead, and provides the security by encrypting data packets, and provides handoff support for UEs between gNBs. The RLC sublayer 303 provides segmentation and reassembly of upper layer data packets, retransmission of lost packets and the reordering of data packets to compensate for the disordered reception resulted by the hybrid automatic repeat request(HARQ). The MAC sublayer 302 provides multiplexing between the logical and transport channels. The MAC sublayer 302 is also responsible for allocating various wireless resources (e.g. resource blocks) in one cell between UEs. The MAC sublayer 302 is also responsible for HARQ operations. In the control plane, the wireless protocol architecture for the UE and gNB is substantially the same for the physical layer 301 and the L2 layer 305, but there is no header compression function for the control plane. The control plane also comprises an RRC (Wireless Resource Control) sublayer 306 in Layer 3 (L3 layer). The RRC sublayer 306 is responsible for obtaining wireless resources (i.e. wireless bearers) and configuring the lower layer using RRC signaling between the gNB and the UE.

In one embodiment, the wireless protocol architecture of FIG. 3 is applicable to the user equipment in this disclosure.

In one embodiment, the wireless protocol architecture of FIG. 3 is applicable to the base station in this disclosure.

In one embodiment, the first control signal in the present disclosure is generated by the PHY 301.

In one embodiment, the first wireless signal in the present disclosure is generated by the PDCP sublayer 304.

In one embodiment, the second wireless signal in the present disclosure is generated by the PDCP sublayer 304.

Embodiment IV

Figure 4:
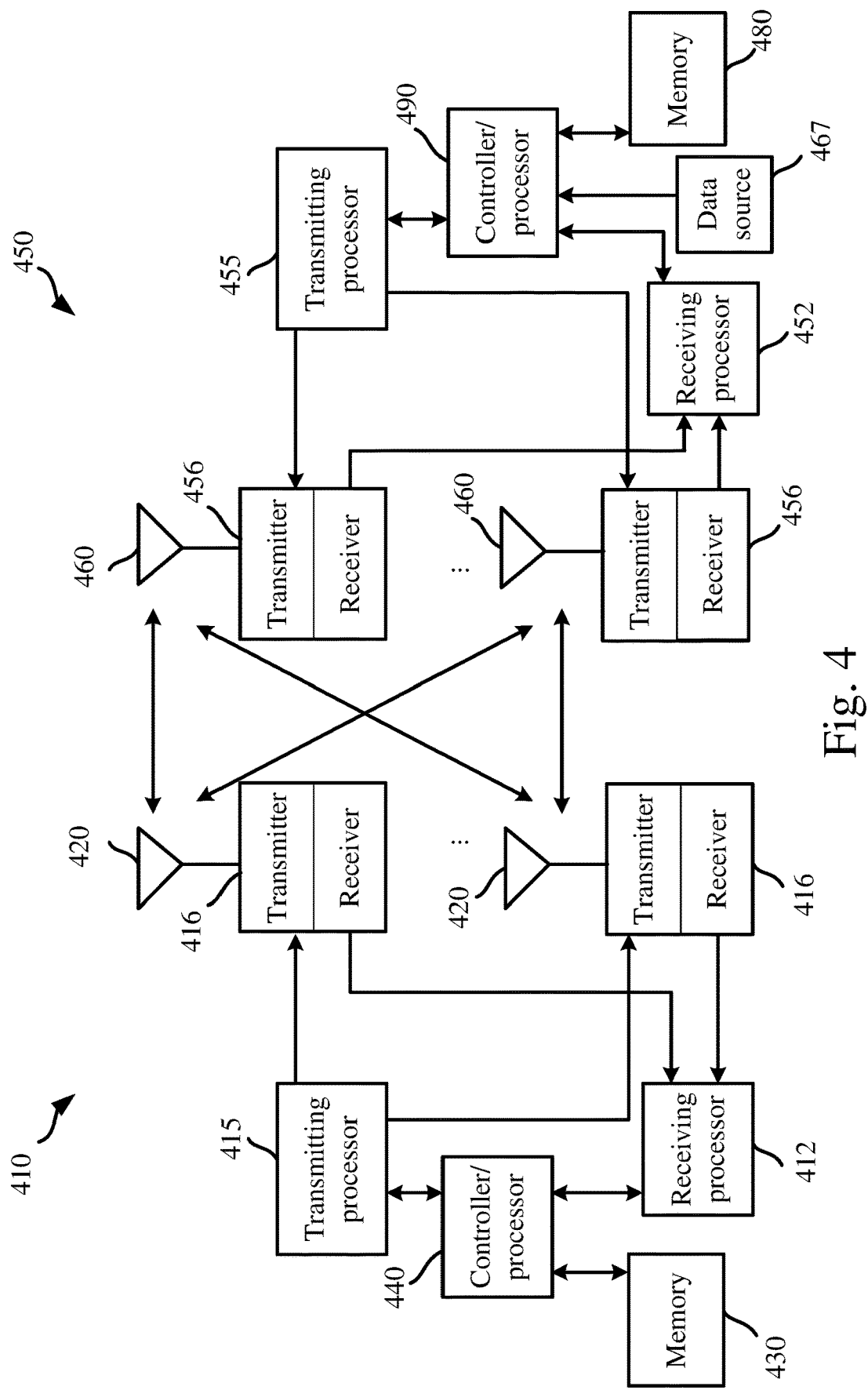
FIG. 4 shows a schematic diagram of base station and user equipment according to one embodiment of the present disclosure.

Embodiment IV shows a schematic diagram of base station equipment and user equipment according to the present disclosure, as shown in FIG. 4. FIG. 4 is a block diagram of a gNB 410 in communication with a UE 450 in an access network.

The base station equipment 410 comprises a controller/ processor 440, a memory 430, a receiving processor 412, a transmitting processor 415, the transmitter/receiver 416 and the antenna 420.

The user equipment 450 comprises a controller/processor 490, a memory 480, a data source 467, a transmitting processor 455, a receiving processor 452, a transmitter/ receiver 456, and an antenna 460.

In the uplink (UL) transmission, the processing related to the base station equipment (410) comprises:

a receiver 416, which receives a wireless frequency signal through its respective antenna 420, converts the received RF signal into a baseband signal and provides the baseband signal to the receiving processor 412;

a receiving processor 412, which implements for the L1 layer (i.e. physical layer) of the various signal processing functions further comprising receiving a multi-antenna reception, demodulation, descrambling, despreading, deinterleaving, channel decoding and physical layer control signaling extraction, etc.

a controller/processor 440, which implements L2 layer functions and is associated with a memory 430 that stores program codes and data;

the controller/processor 440, which provides demultiplexing, packet reassembly, deciphering, header decompression, control signal processing between logical channels and transports to recover the upper layer packet from UE 450; upper layer packets from controller/processor 440 can be provided to the core network;

the controller/processor440, which determines that the target wireless signals may be occupied by a target air interface resource, and transmits the result to the reception processor 412; determining whether or not the target uplink wireless signal occupies the target air interface resource by blind detection; the target wireless signal comprises the second wireless signal in the present disclosure.

In UL transmission, the processing related to the user equipment 450 comprises:

a data source 467, that provides the upper layer packet to a controller/processor 490. The data source 467 represents all protocol layers above the L2 layer;

a transmitter 456, which transmits wireless frequency signals by its respective antenna 460, converts a baseband signal to the radio frequency (RF) signal, and provides the RF signal to the respective antenna 460;

a transmit processor 455, which implements for the L1 layer (i.e. physical layer) of the various signal processing functions further comprising channel coding, scrambling code, code division multiplexing, interleaving, modulation, and multi-antenna transmission and the like;

a controller/processor 490, which implements header compression, encryption, packet segmentation and reordering, and multiplexing between logical and transport channels based on wireless resource allocation of the gNB 410, and implements L2 layer functions for the user plane and the control plane.

the controller/processor 490 is also responsible for HARQ operations, retransmission of lost packets, and the signaling to the gNB 410;

the controller/processor 490, which itself determines the target wireless signal occupied the air interface resource(s), and transmits the result to the transmit processor 455.

In the downlink (DL) transmission, the processes relate to the base station equipment, comprises:

a controller/processor440, which provides header compression, encryption, packet segmentation and reordering, and multiplexing and demultiplexing between logical and transport channels when upper layer packet arrives, for implanting L2 layer protocol of the user plane and the control plane, the upper layer packet may include data or control information, such as downlink shared channel (DL-SCH);

the controller/processor440, which is associated with a memory 430 that stores program codes and data, the memory 430 may be a computer-readable medium;

the controller/processor440, which comprises the scheduling unit for transmitting a demand, the scheduling unit is configured for scheduling the air interface resource(s) corresponding to the requirements of transmission and schedule;

the controller/processor440, which determines to perform the transmission of downlink signaling/data to be transmitted; and transmits the result to the transmission processor 415;

the transmitting processor 415, which receives the output bit stream of the controller/processor 440, and implements for the L1 layer (i.e. physical layer) of the various signal processing functions further comprising coding, interleaving, scrambling, modulation, precoding, power control/allocation and physical layer control signaling (further comprising PBCH, PDCCH,PHICH,PCFICH, reference signal) generation, etc.;

the transmitter 416, which is configured for converting the baseband signals provided by the transmit processor 415 into radio frequency signals and transmitting the signals via the antenna 420; each transmitter 416 samples the respective input symbol stream to obtain respective sampled signal streams. Each transmitter 416 further process the respective sample streams (e.g. digital to analog conversion, amplification, filtering, upconversion, etc.) to obtain a downlink signal.

In the DL transmission, the processing related to the user equipment (450) may include:

a receiver 456, which is configured for converting the radio frequency signal received to a baseband signal through the antenna 460, and the based signal is provided to the receiving processor 452;

a receiving processor 452, which implements for the L1 layer (i.e. physical layer) of the various signal processing functions further comprising multi-antenna reception, demodulation, descrambling, deinterleaving, decoding, and physical layer control signaling extraction;

a controller/processor490, which receives the bit stream output by the receive processor 452, provides header decompression, decryption, packet segmentation and reordering, and multiplexing and demultiplexing between the logical and transport channels to implement L2 layer protocol for user plane and control plane;

the controller/processor 490, which is associated with a memory 480 that stores program codes and data, and the memory 480 may be a computer-readable medium.

In one embodiment, the UE 450 comprises: at least one processor and at least one memory, the at least one memory further comprising computer program codes; the at least one memory and the computer program code are configured to operate with the processor together, the UE 450 at least: receives a first control signal, wherein a first bit block is used to generate the first control signal, the first bit block comprises a first bit field and a second bit field, the first bit field in the first bit block is used to indicate a first spatial parameter group, and the second bit field in the first bit block is used to indicate a first time-frequency resource set; receiving a first wireless signal on the first time-frequency resource set, where the first spatial parameter group is used to receive the first wireless signal, or transmitting a first wireless signal on the first time-frequency resource set, the first spatial parameter group is used to transmit the first wireless signal; transmitting a second wireless signal on a second time-frequency resource set, wherein the second time-frequency resource set is orthogonal to the first time-frequency resource set, and a second spatial parameter group is used to transmit the second wireless signal, a first multiple access signature is used to generate the second wireless signal; wherein the UE 450 itself determines transmitting the second wireless signal on the second time-frequency resource set; the second spatial parameter group is associated with the first bit field in the first bit block, or the first multiple access signature is associated with the first bit field in the first bit block.

In one embodiment, the UE 450 comprises a memory storing a computer readable instruction program, which generates an action when executed by at least one processor, and the action comprises: receiving a first control signal which is generated by a first bit block, the first bit block comprises a first bit field and a second bit field, the first bit field in the first bit block is used to indicate a first spatial parameter group, the second bit field in the first bit block is used to indicate a first time-frequency resource set; and a first wireless signal is received on the first time-frequency resource set, where the first spatial parameter set is used to receive the first wireless signal, or transmitting a first wireless signal on the first time-frequency resource set, the first spatial parameter group is used to transmit the first wireless signal; transmitting a second wireless signal on a second time-frequency resource set, the second time-frequency resource set is orthogonal to the first time-frequency resource set, and a second spatial parameter group is used to transmit the second wireless signal, a first access signature is used to generate the second wireless signal; wherein the UE 450 itself determines transmitting the second wireless signal on the second time-frequency resource set; the second spatial parameter group is associated with the first bit field in the first bit block, or the first multiple access signature is associated with the first bit field in the first bit block.

In one embodiment, the gNB 410 device comprises: at least one processor and at least one memory, the at least one memory comprises computer program codes; the at least one memory and the computer program code are configured to be operated with at least one processor together. The gNB410 device at least: transmitting a first control signal, a first bit block is used to generate the first control signal, the first bit block comprises a first bit field and a second bit field, the first bit field in the first bit block is used to indicate a first spatial parameter group, and the second bit field in the first bit block is used to indicate a first time-frequency resource set; transmitting a first wireless signal on the first time-frequency resource set, where the first spatial parameter group is used to receive the first wireless signal, or receiving a first wireless signal on the first time-frequency resource set, where the first spatial parameter group is used to transmit the first wireless signal; receiving a second wireless signal on a second time-frequency resource set, the second time-frequency resource set is orthogonal to the first time-frequency resource set, and a second spatial parameter group is used to transmit the second wireless signal, a first multiple access signature is used to generate the second wireless signal; wherein transmitter of the second wireless signal itself determines transmitting the second wireless signal on the second time-frequency resource set; the second spatial parameter group is associated with the first bit field in the first bit block, or the first multiple access signature is associated with the first bit field in the first bit block.

In one sub-embodiment, the gNB 410 comprises: a memory storing a computer readable instruction program, which generates an action when executed by at least one processor, and the action comprises: transmitting a first control signal, a first bit block is used to generate the first control signal, the first bit block comprises a first bit field and a second bit field, the first bit field in the first bit block is used to indicate a first spatial parameter group, the second bit field in the first bit block is used to indicate a first time-frequency resource set; transmitting a first wireless signal on the first time-frequency resource set, where the first spatial parameter group is used to receive the first wireless signal, or receive a first wireless signal on the first time-frequency resource set, the first spatial parameter group is used to transmit the first wireless signal; receiving a second wireless signal on a second time-frequency resource set, the second time-frequency resource set is orthogonal to the first time-frequency resource set, and a second spatial parameter group is used to transmit the second wireless signal, a first access signature is used to generate the second wireless signal; wherein transmitter of the second wireless signal itself determines to transmit the second wireless signal on the second time-frequency resource set; the second spatial parameter group is associated with the first bit field in the first bit block, or the first multiple access signature is associated with the first bit field in the first bit block.

In one embodiment, the UE 450 corresponds to the user equipment in this disclosure.

In one embodiment, gNB 410 corresponds to the base station in this disclosure.

In one embodiment, at least first two of antenna 460, the transmitter 456, the transmitting processor 455, and the controller/processor 490 are configured to transmit the first wireless signal in this disclosure.

In one embodiment, at least first two of antenna 460, the receiver 456, the transmitting processor 455, and the controller/processor 490 are configured to transmit the second wireless signal in this disclosure.

In one embodiment, at least first two of antenna 460, the receiver 456, the receiving processor 452, and the controller/processor 490 are configured to receive the first control signal in this disclosure.

In one embodiment, at least first two of antenna 460, the transmitter 456, the transmitting processor 455, and the controller/processor 490 are configured to transmit the second wireless signal in this disclosure.

In one embodiment, at least first two of antenna 420, the receiver 416, the receiving processor 412, and the controller/processor 440 are configured to receive the first wireless signal in this disclosure.

In one embodiment, at least first two of antenna 420, the receiver 416, the receiving processor 412, and the controller/processor 440 are configured to receive the second wireless signal in this disclosure.

In one embodiment, at least first two of antenna 420, the transmitter 416, the transmitting processor 415, and the controller/processor 440 are configured to transmit the first control information in this disclosure.

In one embodiment, at least first two of antenna 420, the transmitter 416, the receiving processor 412, and the controller/processor 440 are configured to receive the second wireless signal in this disclosure.

Embodiment V

Figure 5:
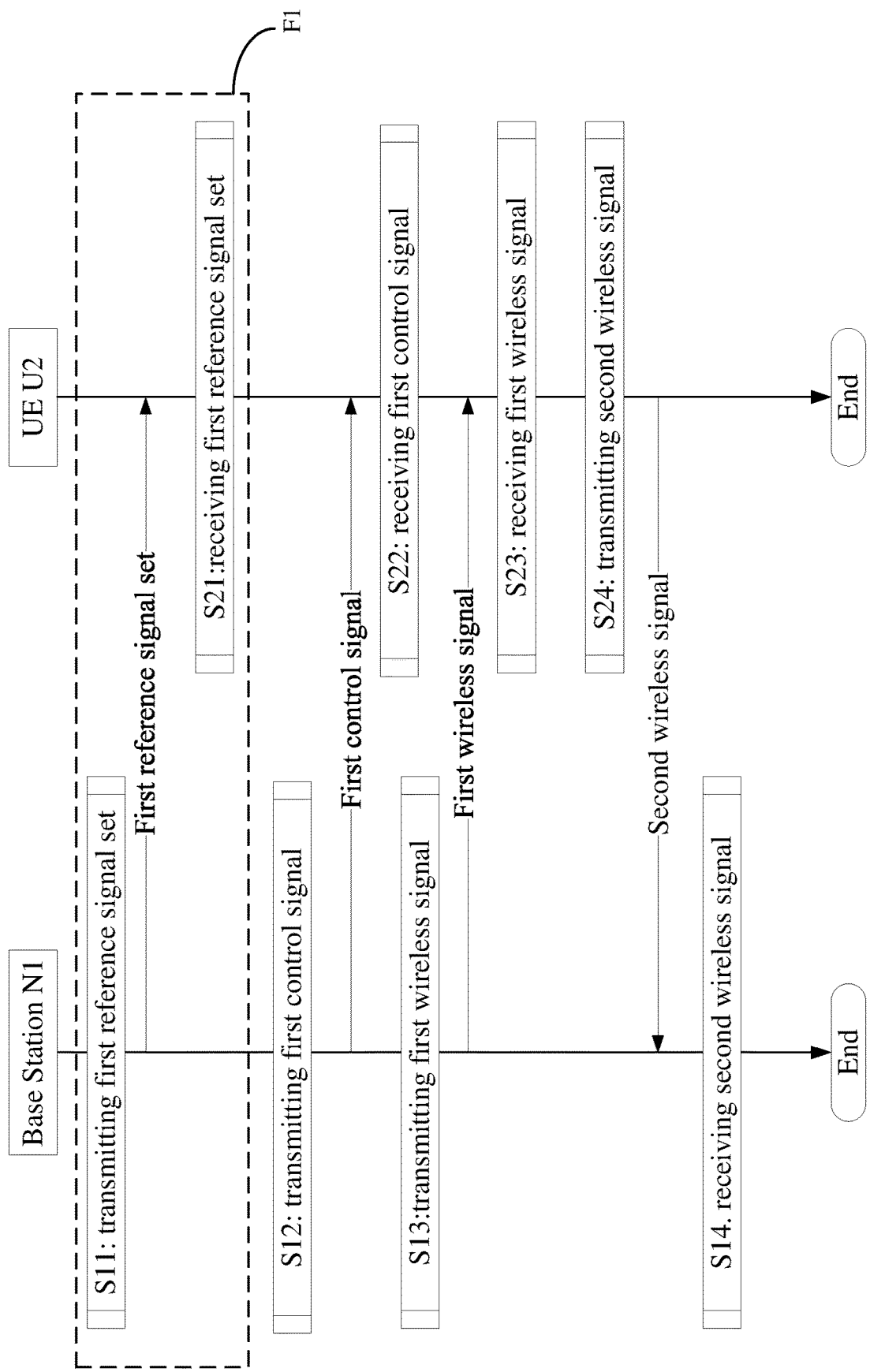
FIG. 5 shows a flow chart of wireless transmission according to one embodiment of the present disclosure.

Embodiment V illustrates a flow chart of wireless transmission, as shown in FIG. 5. In FIG. 5, the base station N1 is a maintenance base station of the serving cell of the user equipment U2. In the figure, the steps in the box identified as F1 are optional.

For the base station N1, in step S11, transmitting a first reference signal set; in step S12, transmitting a first control signal; in step S13, transmitting a first wireless signal; in step S14, receiving a second wireless signal.

For the user equipment U2, in step S21, receiving a first reference signal set; in step S22, receiving a first control signal; in step S23, receiving a first wireless signal; in step S24, transmitting a second wireless signal.

In Embodiment V, a first bit block is used for N1 to generate the first control signal, the first bit block comprises a first bit field and a second bit field, the first bit filed in the first bit block is used by N1 to indicate a first spatial parameter group, and the second bit field in the first bit block is used by N1 to indicate a first time-frequency resource set; U2 receives the first wireless signal on the first time-frequency resource set; the first spatial parameter group is used by U2 to receive the first wireless signal; U2 transmits the second wireless signal on a second time-frequency resource set, and the second time-frequency resource set is orthogonal to the first time-frequency resource set, and a second spatial parameter group is used to transmit the second wireless signal, a first multiple access signature is used to generate the second wireless signal; wherein U2 itself determines transmitting the second wireless signal on the second time-frequency resource set; the second spatial parameter group is associated with the first bit field in the first bit block, or the first multiple access signature is associated with the first bit field in the first bit block.

In one embodiment, the time domain resources occupied by the second time-frequency resource set is associated with the time domain resources occupied by the first control signal.

In one embodiment, the steps in box F1 exist, and the spatial parameter group used by U2 to receive the first reference signal set is used to speculate and obtain the first spatial parameter group by U2.

In one embodiment, the first bit field in the first bit block is used to indicate a first multiple access signature group from M multiple access signature groups, M being a positive integer greater than one, the first multiple access signature group comprises the first multiple access signature.

In one embodiment, U2 itself determines the first multiple access signature from the first multiple access signature group In one embodiment, the first scrambling sequence is used by U2 to generate the second wireless signal, the first scrambling sequence is one of M scrambling sequences, and the M scrambling sequences are respectively used for the M multiple access signature groups, the M multiple access signature groups are in one-to-one correspondence with the M scrambling sequences, and the first scrambling sequence is only scrambling sequence adopted by the first multiple access signature group.

Embodiment VI

Figure 6:
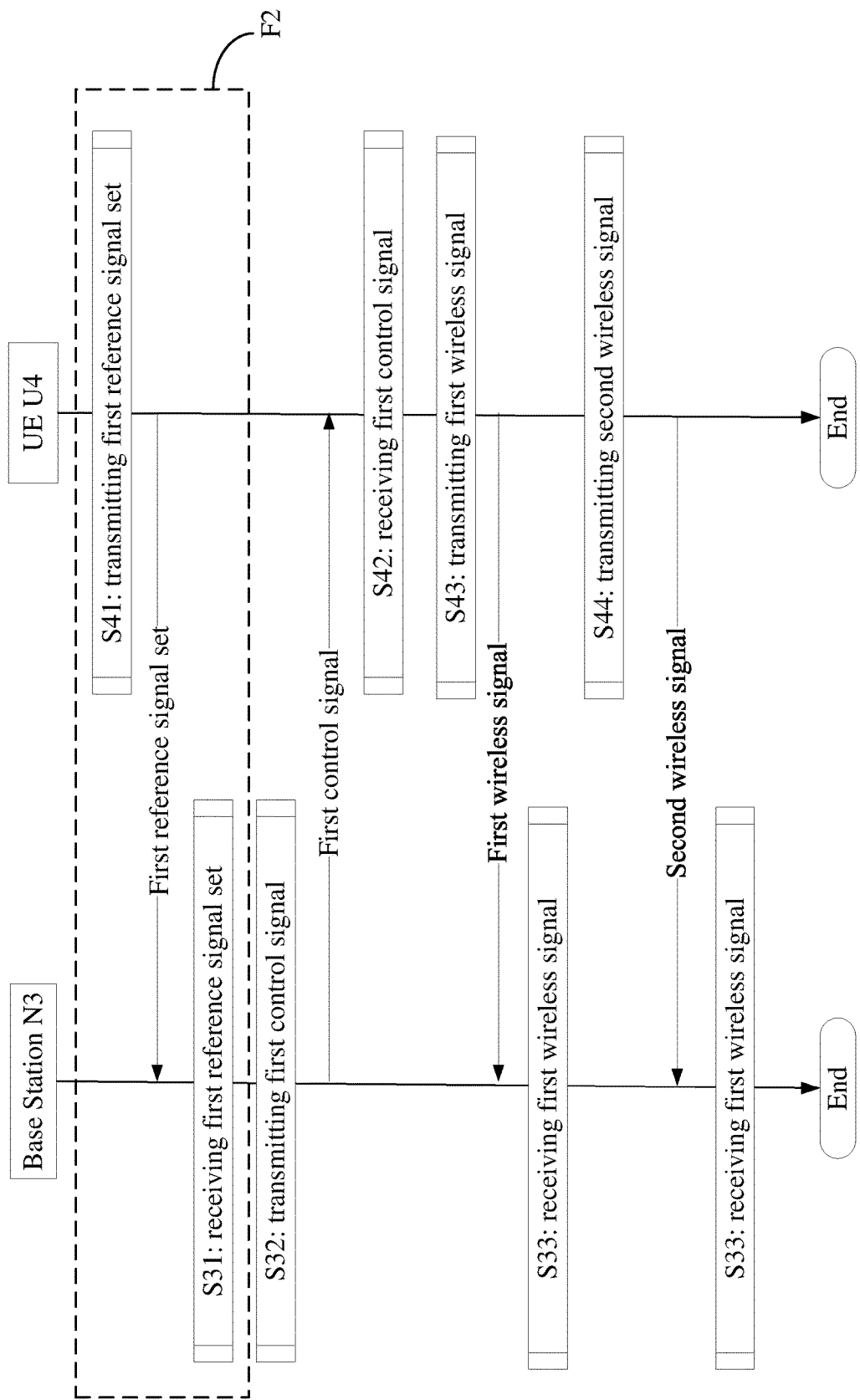
FIG. 6 shows a flow chart of wireless transmission according to another embodiment of the present disclosure.

Embodiment VI illustrates a flow chart of another wireless transmission, as shown in FIG. 6. In FIG. 6, the base station N3 is a maintenance base station of the serving cell of user equipment U4. In the figure, the steps in the box identified as F2 are optional.

For the base station N3, in step S31, receiving a first reference signal set; in step S32, transmitting a first control signal; in step S33, receiving a first wireless signal; in step S34, receiving a second wireless signal.

For the user equipment U4, in step S41, transmitting a first reference signal set; in step S42, receiving a first control signal; in step S43, transmitting a first wireless signal; in step S44, receiving a second wireless signal.

In Embodiment VI, a first bit block is used for N3 to generate the first control signal, the first bit block comprises a first bit field and a second bit field, the first bit filed in the first bit block is used by N3 to indicate a first spatial parameter group, and the second bit field in the first bit block is used by N3 to indicate a first time-frequency resource set; U4 receives the first wireless signal on the first time-frequency resource set; the first spatial parameter group is used by U4 to receive the first wireless signal; U4 transmits the second wireless signal on a second time-frequency resource set, and the second time-frequency resource set is orthogonal to the first time-frequency resource set, and a second spatial parameter group is used to transmit the wireless signal of number 4E8C, a first multiple access signature is used to generate the second wireless signal; wherein U4 itself determines transmitting the second wireless signal on the second time-frequency resource set; the second spatial parameter group is associated with the first bit field in the first bit block, or the first multiple access signature is associated with the first bit field in the first bit block.

In one embodiment, the time domain resources occupied by the second time-frequency resource set is associated with the time domain resources occupied by the first control signal.

In one embodiment, the steps in box F2 exist, and the spatial parameter group used by U4 to transmit the first reference signal set is used to speculate and obtain the first spatial parameter group by U4.

In one embodiment, the first bit field in the first bit block is used to indicate a first multiple access signature group from M multiple access signature groups, M being a positive integer greater than one, the first multiple access signature group comprises the first multiple access signature.

In one embodiment, U2 itself determines the first multiple access signature from the first multiple access signature group.

In one embodiment, the first scrambling sequence is used by U2 to generate the second wireless signal, the first scrambling sequence is one of M scrambling sequences, and the M scrambling sequences are respectively used for the M multiple access signature groups, the M multiple access signature groups are in one-to-one correspondence with the M scrambling sequences, and the first scrambling sequence is only scrambling sequence adopted by the first multiple access signature group.

Embodiment VII

Figure 7:
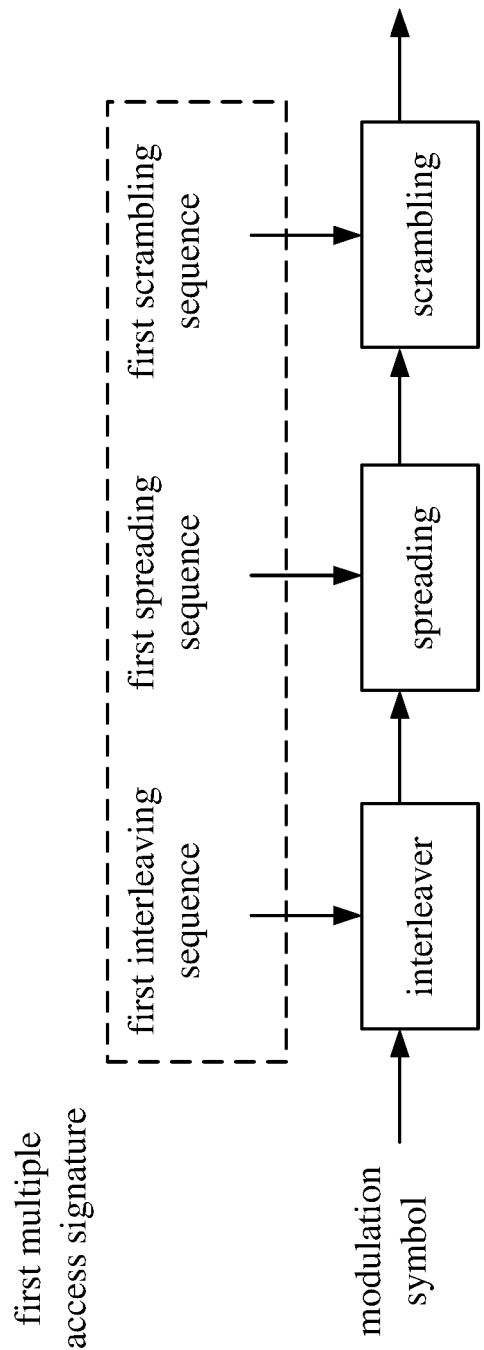
FIG. 7 shows a schematic diagram of a first multiple access signature according to one embodiment of the present disclosure.

Embodiment VII illustrates a schematic diagram of a first multiple access signature, as shown in FIG. 7.

In Embodiment VII, modulation symbols are spread and scrambled prior to transmission, the first multiple access signature comprises at least one of a first interleaving sequence for the interleaver, a first spreading sequence used for spreading and a first scrambling sequence used for scrambling.

In one embodiment, the first interleaving sequence is a sequence for modulation symbol order permutation.

In one embodiment, the first spreading sequence is a Walsh code sequence.

In one embodiment, the first spreading sequence is a Zadoff-Chu sequence.

In one embodiment, the first spreading sequence is a sparse sequence.

In one embodiment, the first spreading sequence is a sequence of a set of orthogonal sequences.

In one embodiment, the first spreading sequence is a sequence of a set of non-orthogonal sequences.

In one embodiment, the first scrambling sequence is a pseudo-random sequence.

In one embodiment, the first scrambling sequence is an m-sequence.

In one embodiment, the first scrambling sequence is a Gold sequence.

In one embodiment, the identifier of the user equipment in this disclosure is used to generate the first interleaving sequence.

In one embodiment, the identifier of the user equipment in this disclosure is used to generate the first spreading sequence.

In one embodiment, the identity of the user equipment in this disclosure is used to generate the first scrambling sequence.

Embodiment VIII

Figure 8:
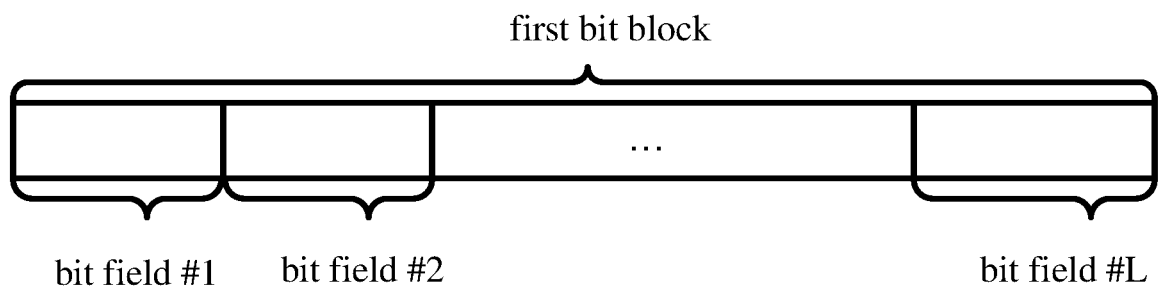
FIG. 8 shows a schematic diagram of a first bit block according to one embodiment of the present disclosure.

Embodiment VIII illustrates a first bit block in this disclosure, as shown in FIG. 8.

In Embodiment VIII, the first bit block is divided into L bit fields, and the first bit field and the second bit field in this disclosure are two fields in the L bit fields. The value of the bit stream in one bit field is used to indicate information corresponding to the bit field. The second bit field is used to indicate resource block(s) included in the first time-frequency resource set in this disclosure. The first bit block is transmitted on a physical downlink control channel. The first wireless signal in this disclosure is transmitted on the first time-frequency resource set.

In one embodiment, the first bit block is a downlink control information bit block for uplink grant.

In one embodiment, the first bit block is a downlink control information bit block for downlink transmission scheduling.

Embodiment IX

Figure 9:
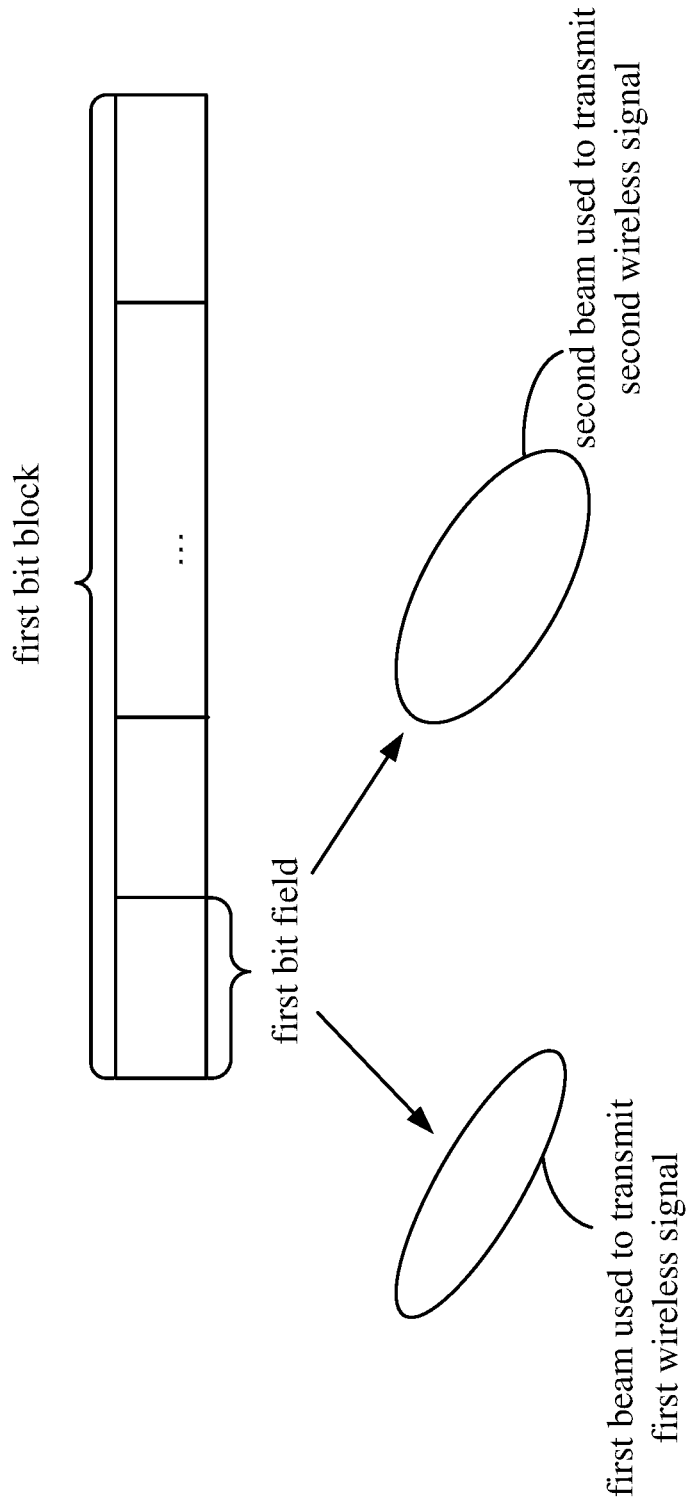
FIG. 9 shows a schematic diagram of a second spatial parameter group associated with the first bit field according to one embodiment of the present disclosure.

Embodiment IX illustrates a schematic diagram of a second spatial parameter group associated with a first bit field in this disclosure, as shown in FIG. 9.

In Embodiment IX, the first bit field in the first bit block in this disclosure is used to simultaneously indicate a first beam for transmitting the first wireless signal in this disclosure and a second beam for transmitting the second wireless signal in this disclosure, the first spatial parameter group in this disclosure is used to generate the first beam, and the second spatial parameter group in this disclosure is used to generate the second beam.

In one embodiment, the first beam is used to transmit the first wireless signal. In one embodiment, the first beam is used to receive the first wireless signal.

In one embodiment, the first bit field is used to indicate that the channel experienced by the first wireless signal and the channel experienced by the second wireless signal are spatially QCL.

In one embodiment, the first bit field is used to indicate that a spatial parameter group used to receive the first wireless signal is spatially associated with a spatial parameter group used to receive the second wireless signal.

In one embodiment, the first bit field indicates the first reference signal set in this disclosure, and the channel experienced by the first reference signal set and the channel experienced by the first wireless signal and the channel experienced by the second wireless signal are spatially QCL.

Embodiment X

Figure 10:
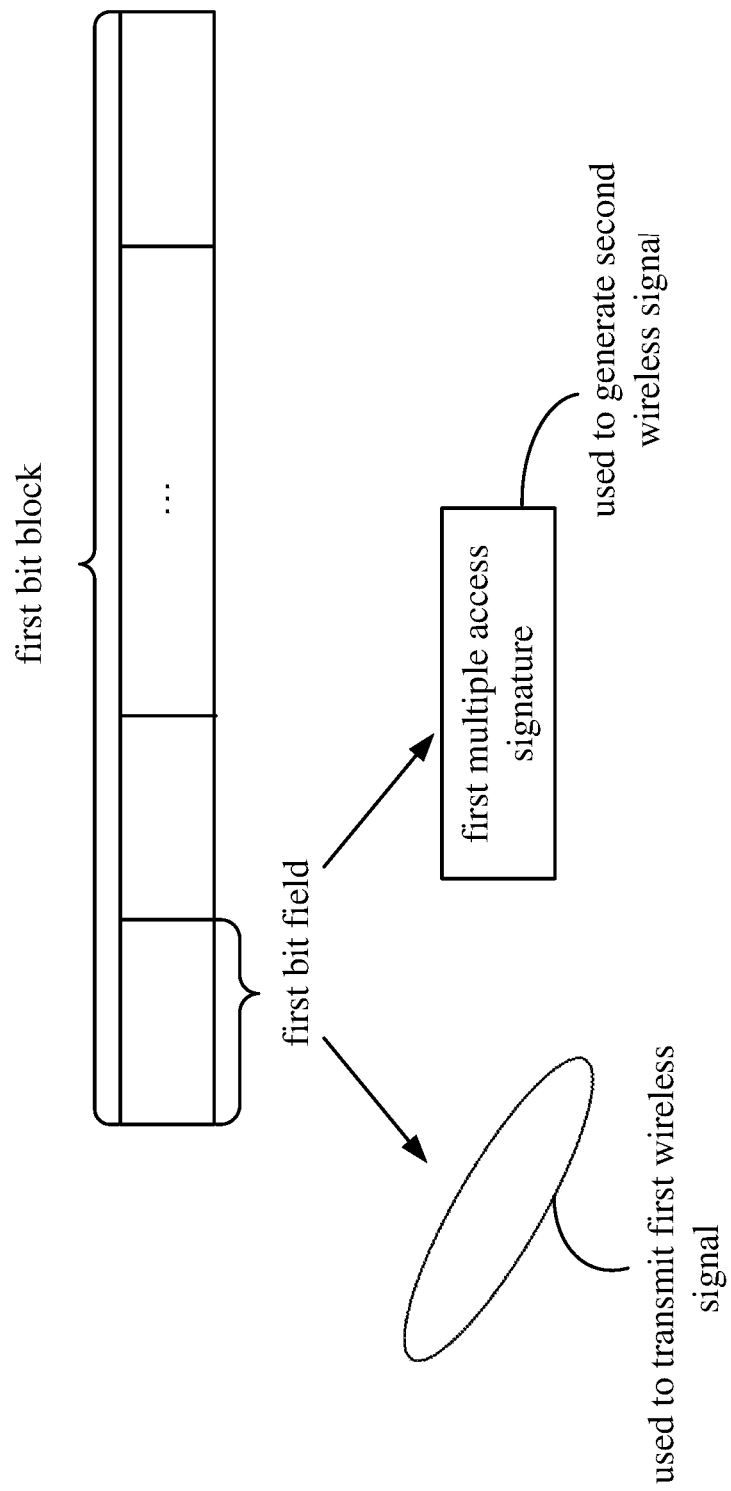
FIG. 10 shows a schematic diagram of a first multiple access signature associated with a first bit field according to one embodiment of the present disclosure.

Embodiment X illustrates a schematic diagram of a first multiple access signature in this disclosure associated with a first bit field in this disclosure, as shown in FIG. 10.

In the embodiment X, the first bit field in the first bit block in this disclosure is used to simultaneously indicate a first beam for transmitting the first wireless signal in this disclosure and the first multiple access signature for generating the second wireless signal in this disclosure.

In one embodiment, the first spatial parameter group in this disclosure is used to generate the first beam.

In one embodiment, the first beam is used to transmit the first wireless signal.

In one embodiment, the first beam is used to receive the first wireless signal.

In one embodiment, the first multiple access signature is associated with the first spatial parameter group.

In one embodiment, the multiple access signature group in which the first multiple access signature is located is associated with the first spatial parameter group.

In one embodiment, the first bit field indicates a first reference signal set in this disclosure, and the channel experienced by the first reference signal set and the channel experienced by the first wireless signal and the channel experience by the second wireless signal experience are spatially QCL.

In one embodiment, the first multiple access signature is associated with the first reference signal set.

In one embodiment, the multiple access signature group in which the first multiple access signature is located is associated with the first reference signal set.

Embodiment XI

Figure 11:
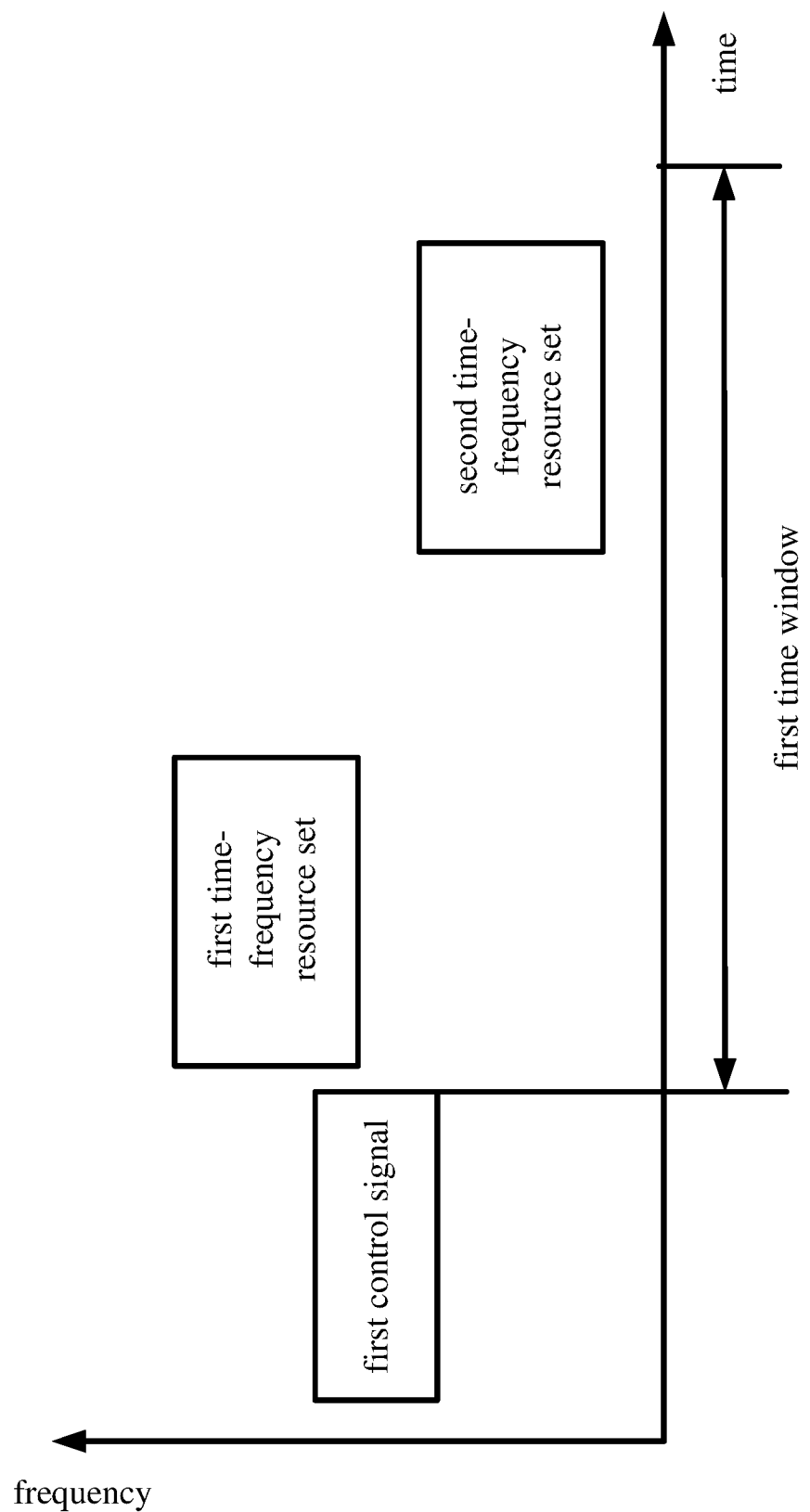
FIG. 11 shows a schematic diagram of a first time-frequency resource set and a second time-frequency resource set according to one embodiment of the present disclosure.

Embodiment XI illustrates a first time-frequency resource set and a second time-frequency resource set, as shown in FIG. 11.

In the embodiment XI, the first control signal in this disclosure indicates the first time-frequency resource set in this disclosure, and time domain resources occupied by the first control signal is used to determine a first time window, the second time-frequency resource set is in the first time window.

In one embodiment, RRC signaling is used to configure a first time-frequency resource pool, and the second time-frequency resource set belongs to the first time-frequency resource pool.

In one embodiment, the user equipment itself determines to transmit the second wireless signal in this disclosure on the second time-frequency resource set.

Embodiment XII

Figure 12:
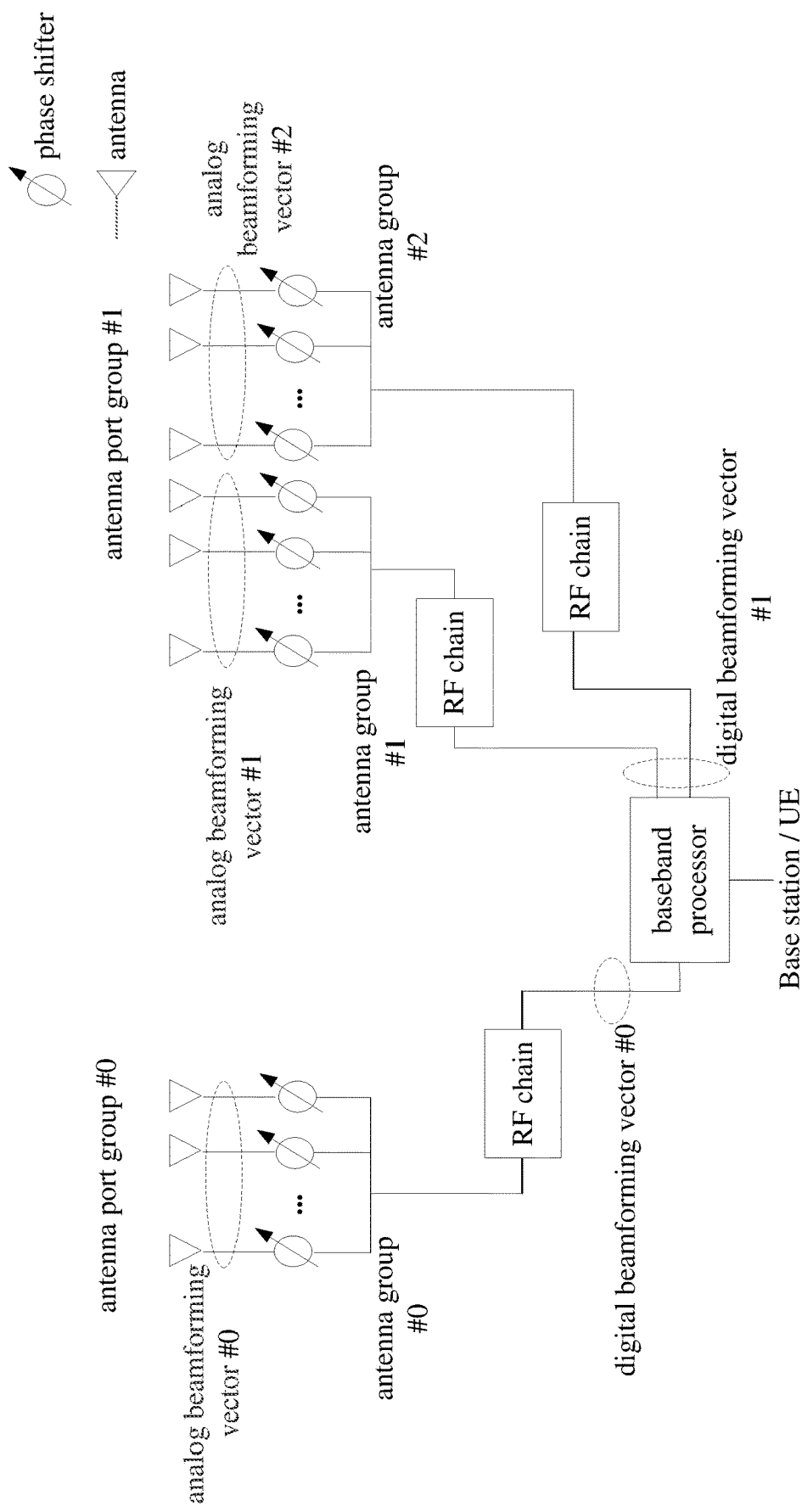
FIG. 12 shows a schematic diagram of the antenna port groups for transmitting wireless signal according to one embodiment of the present disclosure.

Embodiment XII illustrates the antenna port groups for transmitting wireless signal, as shown in FIG. 12.

The FIG. 12 shows a schematic diagram of the antenna port groups for transmitting a wireless signal in this disclosure.

In FIG. 12, one antenna port group comprises a positive integer number of antenna ports; one antenna port is formed by superimposing antennas in a positive integer number of antenna groups through antenna virtualization; and one antenna group comprises a positive integer antenna. An antenna group is connected to the baseband processor through an RF (radio frequency) chain, and different antenna groups correspond to different RF chains. A mapping coefficient of all antennas within a positive integer number of antenna groups included in a given antenna port to the given antenna port constitutes a beamforming vector corresponding to the given antenna port. The mapping coefficients of the plurality of antennas included in any given antenna group included in a given integer number of antenna groups included in the given antenna port to the given antenna port constitute an analog beamforming vector of the given antenna group. The diagonal arrangement of the analog beamforming vectors corresponding to the positive integer antenna groups constitutes an analog beam shaping matrix corresponding to the given antenna port. The mapping coefficients of the positive integer number of antenna groups to the given antenna port constitute a digital beamforming, vector corresponding to the given antenna port. The beamforming vector corresponding to the given antenna port is obtained by multiplying the analog beam shaping matrix and the digital beam shaping vector corresponding to the given antenna port. Different antenna ports in one antenna port group are composed of the same antenna group, and different antenna ports in the same antenna port group correspond to different beamforming vectors.

Two antenna port groups are shown in FIG. 12: antenna port group #0 and antenna port group #1. Specifically, the antenna port group #0 is composed of an antenna group #0, and the antenna port group #1 is composed of an antenna group #1 and an antenna group #2. The mapping coefficients of the plurality of antennas in the antenna group #0 to the antenna port group #0 constitute an analog beamforming vector #0, and the mapping coefficients of the antenna group #0 to the antenna port group #0 constitute a number beamforming vector #0. The mapping coefficients of the plurality of antennas in the antenna group #1 and the plurality of antennas in the antenna group #2 to the antenna port group #1 constitute an analog beamforming vector #1 and analog beamforming vector #2, respectively. The mapping coefficients of the antenna group #1 and the antenna group #2 to the antenna port group #1 constitute a digital beamforming vector #1. The mapping coefficients of the plurality of antennas in the antenna group #1 and the plurality of antennas in the antenna group #2 to the antenna port group #1 constitute an analog beamforming vector #1 and analog beamforming vector #2, respectively. The mapping coefficients of the antenna group #1 and the antenna group #2 to the antenna port group #1 constitute a digital beamforming vector #1. A beamforming vector corresponding to any one of the antenna port groups #0 is obtained by multiplying the analog beamforming vector #0 and the digital beamforming vector #0. The beamforming vector corresponding to any antenna port in the antenna port group #1 is an analog beam shaping matrix formed by diagonally arranging the analog beamforming vector #1 and the analog beamforming vector #2 obtained from the product of the digital beamforming vector #1.

In one embodiment, one antenna port group comprises an antenna port. Such as, the antenna port group #0 in FIG. 12 comprises an antenna port group.

In one sub-embodiment of the foregoing embodiment, the analog beam shaping matrix corresponding to the one antenna port is reduced into an analog beamforming vector, and the digital beamforming vector corresponding to the one antenna port is reduced to a scalar. The beamforming vector corresponding to one antenna port is equal to the analog beamforming vector corresponding to the one antenna port.

In one embodiment, one antenna port group comprises one antenna port. For example, the antenna port group #1 in FIG. 12 comprises a plurality of antenna ports.

As an auxiliary embodiment of the foregoing embodiment, the plurality of antenna ports correspond to the same analog beam shaping matrix and different digital beamforming vectors.

In one embodiment, different antenna port groups correspond to different simulation beam forming array.

In one embodiment, any two antenna ports in an antenna port group are QCL.

In one embodiment, any two antenna ports in an antenna port group are spatial QCL.

Embodiment XIII

Figure 13:
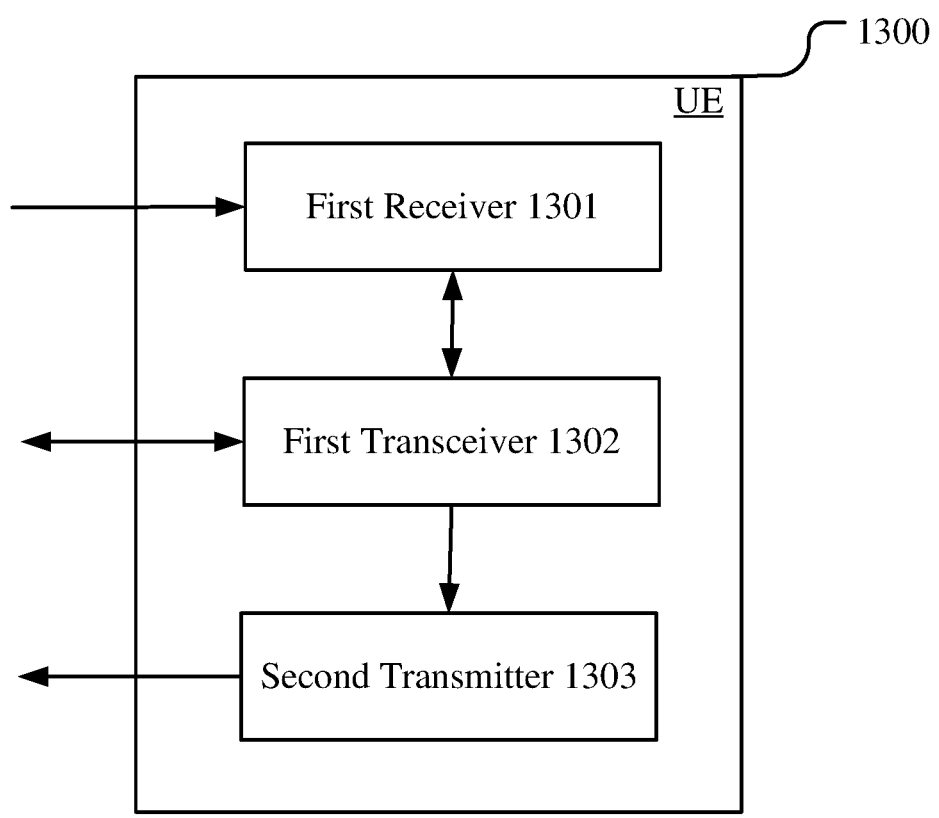
FIG. 13 shows a structural block diagram of a processing device in a UE according to one embodiment of the present disclosure.

Embodiment XIII illustrates a structural block diagram of a processing device in a. UE, as shown in FIG. 13. In the FIG. 13, the UE processing device 1300 comprises a first receiver 1301, a first transceiver 1302 and a second transmitter 1303.

The first receiver 1301 receives a first control signal, the first transceiver 1302 receives or transmits a first wireless signal, and the second transceiver 1303 transmits a second wireless signal.

In embodiment XIII, a first bit block is used to generate the first control signal, the first bit block comprises a first bit field and a second bit field, the first bit field in the first bit block is used to indicate a first spatial parameter group, the second bit field in the first bit block is used to indicate a first time-frequency resource set; and the first wireless signal is received on the first time-frequency resource set, the first spatial parameter group is used to receive the first wireless signal, or transmit a first wireless signal on the first time-frequency resource set, where the first spatial parameter group is used for transmitting the first wireless signal; the second wireless signal is transmitted on the second time-frequency resource set, the second time-frequency resource set is orthogonal to the first time-frequency resource set, and a second spatial parameter group is used for transmitting the second wireless signal, a first multiple access signature is used to generate the second wireless signal; wherein the UE 1300 itself determines to transmit the second wireless signal on the second time-frequency resource set; the second spatial parameter group is associated with the first bit field in the first bit block, or, the first multiple-access signature is associated with the first bit field in the first bit block.

In one embodiment, the first receiver 1301 comprises the receiver 456 and the receiving processor 452 of the embodiment IV.

In one embodiment, the first transceiver 1302 comprises the receiver 456 and the receiving processor 452 of the embodiment IV.

In one embodiment, the first transceiver 1302 comprises the transmitter 456 and the transmission processor 455 of the embodiment IV.

In one embodiment, the second transmitter 1303 comprises the transmitter 456 and the transmission processor 455 of the embodiment IV.

In one embodiment, the first receiver 1301, the first transceiver 1302 and the second receiver 1303 all comprises the antenna 460 of the embodiment IV.

In one embodiment, the first receiver 1301, the first transceiver 1302 and the second transmitter 1303 all comprises the controller/processor 490 of the embodiment IV.

In one embodiment, time domain resources occupied by the second time-frequency resource set is associated with time domain resources occupied by the first control signal.

In one embodiment, the first transceiver 1302 receives a first reference signal set before receiving the first control signal, and a spatial parameter group used to receive the first reference signal set is used to speculate to obtain the first spatial parameter group, or transmits a first reference signal set, a spatial parameter group used to transmit the first reference signal set is used to speculate to obtain the first spatial parameter group; wherein the first bit field in the first bit block indicates the first reference signal set.

In one embodiment, the first bit field in the first bit block is used to indicate a first multiple access signature group from M multiple access signature groups, M being a positive integer greater than one, the first multiple access signature group comprises the first multiple access signature.

In one embodiment, the second transmitter 1303 determines the first multiple access signature from the first multiple access signature group.

In one embodiment, a first scrambling sequence is used by the second transmitter 1303 to generate the second wireless signal, the first scrambling sequence is one of M scrambling sequences, and the M scrambling sequences are respectively used for the M multiple access signature groups, the M multiple access signature groups are in one-to-one correspondence with the M scrambling sequences, and the first scrambling sequence is only scrambling sequence adopted by the first multiple access signature sequence.

Embodiment XIV

Figure 14:
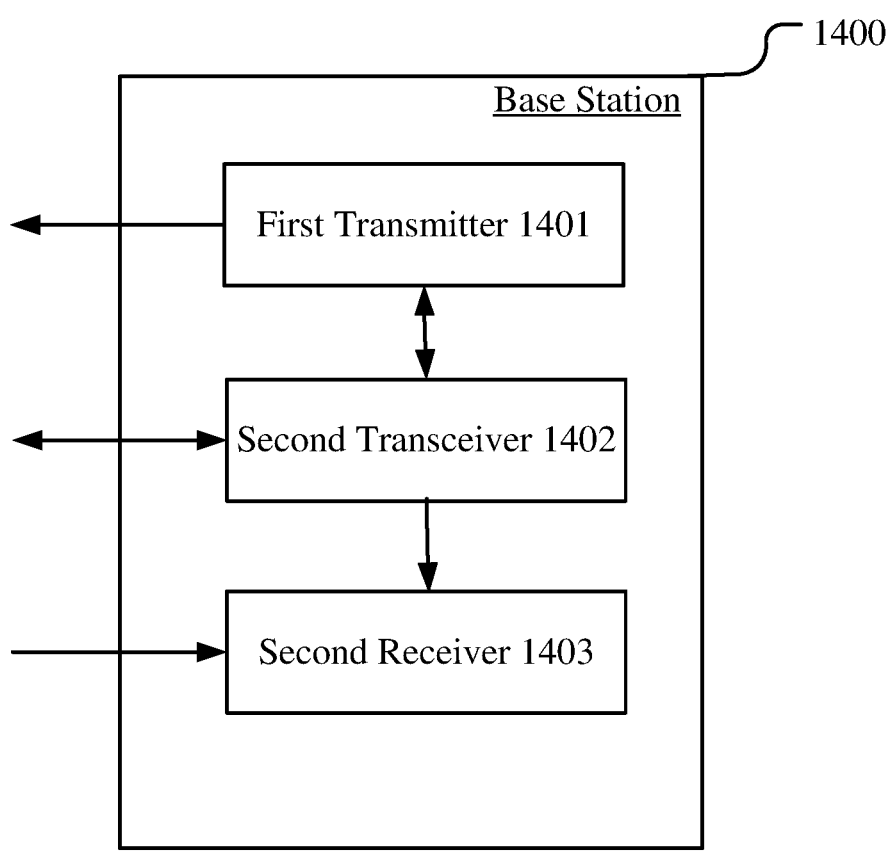
FIG. 14 shows a structural block diagram of a processing device in the base station equipment according to one embodiment of the present disclosure.

Embodiment XIV illustrates a structural block diagram of a processing device in the base station equipment, as shown in FIG. 14. In FIG. 14, the processing device 1400 in the base station equipment comprises a first transmitter 1401, a second transceiver 1402, and a second receiver 1403.

The first transmitter 1401 transmits a first control signal, the second transceiver 1402 transmits or receives a first wireless signal, and the second receiver 1403 receives a second wireless signal.

In the embodiment XIV, a first bit block is used to generate the first control signal, the first bit block comprises a first bit field and a second bit field, the first bit field in the first bit block is used to indicate a first spatial parameter group, the second bit field in the first bit block is used to indicate a first time-frequency resource set; and the first wireless signal is transmitted on the first time-frequency resource set, the first spatial parameter group is used to receive the first wireless signal, or receive a first wireless signal on the first time-frequency resource set, where the first spatial parameter group is used for transmitting the first wireless signal; the second wireless signal is received on the second time-frequency resource set, the second time-frequency resource set is orthogonal to the first time-frequency resource set, and a second spatial parameter group is used for transmitting the second wireless signal, a first multiple access signature is used to generate the second wireless signal; wherein transmitter of the second wireless signal itself determines to transmit the second wireless signal on the second time-frequency resource set; the second spatial parameter group is associated with the first bit field in the first bit block, or, the first multiple access signature is associated with the first bit field in the first bit block.

In one embodiment, the first transmitter 1401 comprises the transmitter 416 and the transmitting processor 415 of the embodiment IV.

In one embodiment, the second transceiver 1402 comprises the transmitter 416 and the transmitting processor 415 of the embodiment IV.

In one embodiment, the second transceiver 1402 comprises the receiver 416 and the receiving processor 412 of the embodiment IV.

In one embodiment, the second transmitter 1403 comprises the receiver 416 and the receiving processor 412 of the embodiment IV.

In one embodiment, the first transmitter 1401, the second transceiver 1402, and the second receiver 1403 all include the antenna 420 of the embodiment IV.

In one embodiment, the first transmitter 1401, the second transceiver 1402, and the second receiver 1403 all include the controller/processor 440 of the embodiment IV.

In one embodiment, time domain resources occupied by the second time-frequency resource set is associated with time domain resources occupied by the first control signal.

In one embodiment, the second transceiver 1402 transmits a first reference signal group before transmitting the first control signal, and a spatial parameter group used to receive the first reference signal set is used to speculate to obtain the a first spatial parameter group, or receiving a first reference signal set, a spatial parameter group used to transmit the first reference signal set is used to speculate to obtain the first spatial parameter group; wherein the first bit field in the bit block indicates the first reference signal set.

In one embodiment, the first bit field in the first bit block is used to indicate a first multiple access signature group from M multiple access signature groups, M being a positive integer greater than one, the first multiple access signature group comprises the first multiple access signature.

In one embodiment, transmitter of the second wireless signal itself determines the first multiple access signature from the first multiple access signature group In one embodiment, a first scrambling sequence is used to generate the second wireless signal, the first scrambling sequence is one of M scrambling sequences, and the M scrambling sequences are respectively used for the M multiple access signature groups, the M multiple access signature groups are in one-to-one correspondence with the M scrambling sequences, and the first scrambling sequence is only scrambling sequence adopted by the first multiple access signature group.

One of ordinary skill in the art can appreciate that all or part of the above steps can be completed by a program to instruct related hardware, and the program can be stored in a computer readable storage medium such as a read only memory, a hard disk or an optical disk. Alternatively, all or part of the steps of the above embodiments may also be implemented using one or more integrated circuits. Correspondingly, each module unit in the above embodiment may be implemented in hardware form or in the form of a software function module. The application is not limited to any specific combination of software and hardware. The user equipment, terminal and UE in the present disclosure include but are not limited to a drone, a communication module on the drone, a remote control aircraft, an aircraft, a small aircraft, a mobile phone, a tablet computer, a notebook, a vehicle communication device, a wireless sensor, an internet card, Internet of Things terminal, RFID terminal, NB-IOT terminal, MTC (Machine Type Communication) terminal, eMTC (enhanced MTC), data card, network card, vehicle communication device, low-cost mobile phone, low Cost equipment such as tablets. The base station in the present disclosure comprises, but is not limited to, a macro communication base station, a micro cell base station, a home base station, a relay base station, a gNB (NR Node B), a TRP (Transmitter Receiver Point), and the like.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A method for wireless communication in a user equipment (UE), comprising:
    receiving a first control signal, wherein a first bit block is used to generate the first control signal, the first bit block comprises a first bit field and a second bit field, the first bit field in the first bit block is used to indicate a first spatial parameter group, and the second bit field in the first bit block is used to indicate a first time-frequency resource set;
    receiving a first wireless signal on the first time-frequency resource set, wherein the first spatial parameter group is used to receive the first wireless signal, or transmitting a first wireless signal on the first time-frequency resource set, wherein the first spatial parameter group is used to transmit the first wireless signal;
    transmitting a second wireless signal on a second time-frequency resource set, wherein the second time-frequency resource set is orthogonal to the first time-frequency resource set, and a second spatial parameter group is used to transmit the second wireless signal, wherein a first multiple access signature is used to generate the second wireless signal;
    wherein the user equipment itself determines that the second wireless signal is transmitted on the second time-frequency resource set; the second spatial parameter group is associated with the first bit field in the first bit block, or the first multiple access signature is associated with the first bit field in the first bit block.

2. The method of claim 1, wherein time domain resources occupied by the second time-frequency resource set is associated with time domain resources occupied by the first control signal.

3. The method of claim 1, further comprising:
    receiving a first reference signal set before receiving the first control signal, wherein a spatial parameter group used to receive the first reference signal set is used to speculate to obtain the first spatial parameter group, or transmitting the first reference signal set before receiving the first control signal, wherein a spatial parameter group used to transmit the first reference signal set is used to speculate to obtain the first spatial parameter group;
    wherein the first bit field in the first bit block indicates the first reference signal set.

4. The method of claim 1, wherein the first bit field in the first bit block is used to indicate a first multiple access signature group from M multiple access signature groups, M being a positive integer greater than one, the first multiple access signature group comprises the first multiple access signature.

5. The method of claim 4, wherein the user equipment determines the first multiple access signature from the first multiple access signature group; or a first scrambling sequence is used to generate the second wireless signal, the first scrambling sequence is one of M scrambling sequences, and the M scrambling sequences are respectively used for the M multiple access signature groups, and the M multiple access signature groups and the M scrambling sequences are in one-to-one correspondence, and the first scrambling sequence is the only scrambling sequence adopted by the first multiple access signature group.

6. A method for wireless communication in a base station (BS), comprising:
    transmitting a first control signal, wherein a first bit block is used to generate the first control signal, the first bit block comprises a first bit field and a second bit field, the first bit field in the first bit block is used to indicate a first spatial parameter group, and the second bit field in the first bit block is used to indicate a first time-frequency resource set;
    transmitting a first wireless signal on the first time-frequency resource set, wherein the first spatial parameter group is used by a target receiver of the first wireless signal to receive the first wireless signal, or receiving a first wireless signal on the first time-frequency resource set, wherein the first spatial parameter group is used by a transmitter of the first wireless signal to transmit the first wireless signal;
    receiving a second wireless signal on a second time-frequency resource set, wherein the second time-frequency resource set is orthogonal to the first time-frequency resource set, and a second spatial parameter group is used by a transmitter of the second wireless signal to transmit the second wireless signal, wherein a first multiple access signature is used to generate the second wireless signal;
    wherein the transmitter of the second wireless signal itself determines that the second wireless signal is transmitted on the second time-frequency resource set; the second spatial parameter group is associate with the first bit field in the first bit block, or the first multiple access signature is associated with the first bit field in the first bit block.

7. The method of claim 6, wherein time domain resources occupied by the second time-frequency resource set is associated with time domain resources occupied by the first control signal.

8. The method of claim 6, comprising:
    transmitting a first reference signal set before transmitting the first control signal, a spatial parameter group used to receive the first reference signal set is used to speculate to obtain the first spatial parameter group, or receiving a first reference signal set before transmitting the first control signal, a spatial parameter group used to transmit the first reference signal set is used to speculate to obtain the first spatial parameter group;
    wherein the first bit field in the first bit block indicates the first reference signal set.

9. The method of claim 6, wherein the first bit field in the first bit block is used to indicate a first multiple access signature group from M multiple access signature groups, M being a positive integer greater than one, the first multiple access signature group further comprising the first multiple access signature.

10. The method of claim 9, wherein the transmitter of the second wireless signal itself determines the first multiple access signature from the first multiple access signature group; or a first scrambling sequence is used to generate the second wireless signal, the first scrambling sequence is one of M scrambling sequences, and the M scrambling sequences are respectively used for the M multiple access signature groups, and the M multiple access signature groups are in one-to-one correspondence with the M scrambling sequences, and the first scrambling sequence is the only scrambling sequence adopted by the first multiple access signature group.

11. The user equipment (UE) for wireless communication, comprising:
   a first receiver, receiving a first control signal, wherein a first bit block is used to generate the first control signal, the first bit block comprises a first bit field and a second bit field, the first bit field in the first bit block is used to indicate a first spatial parameter group, and the second bit field in the first bit block is used to indicate a first time-frequency resource set;
   a first transceiver, receiving a first wireless signal on the first time-frequency resource set, wherein the first spatial parameter group is used to receive the first wireless signal, or transmitting a first wireless signal on the first time-frequency resource set, wherein the first spatial parameter group is used to transmit the first wireless signal;
   a second transmitter, transmitting a second wireless signal on a second time-frequency resource set, wherein the second time-frequency resource set is orthogonal to the first time-frequency resource set, and a second spatial parameter group is used to transmit the second wireless signal, wherein the second wireless signal is generated by a first multiple access signature;
   wherein the user equipment itself determines to transmit the second wireless signal on the second time-frequency resource set; the second spatial parameter group is associated with the first bit field in the first bit block, or the first multiple access signature is associated with the first bit field in the first bit block.

12. The UE of claim 11, wherein time domain resources occupied by the second time-frequency resource set is associated with time domain resource occupied by the first control signal.

13. The UE of claim 11, further comprising:
   receiving a first reference signal set before receiving the first control signal, wherein a spatial parameter group used to receive the first reference signal set is used to speculate to obtain the first spatial parameter group, or transmitting a first reference signal group before receiving the first control signal, wherein a spatial parameter group used to transmit the first reference signal set is used to speculate to obtain the first spatial parameter group;
   wherein the first bit field in the first bit block indicates the first reference signal set.

14. The UE of claim 11, wherein the first bit field in the first bit block is used to indicate a first multiple access signature group from M multiple access signature groups, M is a positive integer greater than one, the first multiple access signature group comprises the first multiple access signature.

15. The UE of claim 14, wherein the user equipment itself determines the first multiple access signature from the first multiple access signature group; or a first scrambling sequence is used to generate the second wireless signal, the first scrambling sequence is one of M scrambling sequences, and the M scrambling sequences are respectively used for the M multiple access signature groups, and the M multiple access signature groups and the M scrambling sequences are in one-to-one correspondence, and the first scrambling sequence is only scrambling sequence adopted by the first multiple access signature group.

16. A base station equipment for a wireless communication, comprising:
   a first transmitter, transmitting a first control signal, wherein a first bit block is used to generate the first control signal, the first bit block comprises a first bit field and a second bit field, wherein the first bit field in the first bit block is used to indicate a first spatial parameter group, and the second bit field in the first bit block is used to indicate a first time-frequency resource set;
   a second transceiver, transmitting a first wireless signal on the first time-frequency resource set, wherein the first spatial parameter group is used by a target receiver of the first wireless signal to receive the first wireless signal, or receiving the first wireless signal on the first time-frequency resource set, the first spatial parameter group being used by a transmitter of the first wireless signal to transmit the first wireless signal;
   a second receiver, receiving a second wireless signal on a second time-frequency resource set, wherein the second time-frequency resource set is orthogonal to the first time-frequency resource set, a second spatial parameter group is used by a transmitter of the second wireless signal to transmit the second wireless signal, wherein the second wireless signal is generated by a first multiple access signature;
   wherein the transmitter of the second wireless signal itself determines to transmit the second wireless signal on the second time-frequency resource set; the second spatial parameter group is associated with the first bit field in the first bit block, or the first multiple access signature is associated with the first bit field in the first bit block.

17. The base station equipment of claim 16, wherein time domain resources occupied by the second time-frequency resource set is associated with time domain resources occupied by the first control signal.

18. The base station equipment of claim 16, further comprising:
   transmitting a first reference signal set before transmitting the first control signal, wherein a spatial parameter group used to receive the first reference signal set is used to speculate to obtain the first spatial parameter group, or receiving a first reference signal set before transmitting the first control signal, wherein a spatial parameter group used to transmit the first reference signal set is used to speculate to obtain the first spatial parameter group;
   wherein the first bit field in the first bit block indicates the first reference signal set.

19. The base station equipment of claim 16, wherein the first bit field in the first bit block is used to indicate a first multiple access signature group from M multiple access signature groups, M is a positive integer greater than one, the first multiple access signature group comprises the first multiple access signature.

20. The base station equipment of claim 19, wherein the transmitter of the second wireless signal itself determines the first multiple access signature from the first multiple access signature group; or a first scrambling sequence is used to generate the second wireless signal, the first scrambling sequence is one of M scrambling sequences, and the M scrambling sequences are respectively used for the M multiple access signature groups, and the M multiple access signature groups and the M scrambling sequences are in one-to-one correspondence, the first scrambling sequence is only scrambling sequence adopted by the first multiple access signature group.

\* \* \* \* \*